US008993062B2

(12) United States Patent
Tutin et al.

(10) Patent No.: US 8,993,062 B2
(45) Date of Patent: Mar. 31, 2015

(54) METHODS FOR MAKING LAMINATED, SATURATED, AND ABRASIVE PRODUCTS

(71) Applicant: Georgia-Pacific Chemicals LLC, Atlanta, GA (US)

(72) Inventors: Kim Tutin, East Point, GA (US); Benjamin D. Gapud, Snellville, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 1 day.

(21) Appl. No.: 13/860,036

(22) Filed: Apr. 10, 2013

(65) Prior Publication Data

US 2013/0266731 A1    Oct. 10, 2013

Related U.S. Application Data

(60) Provisional application No. 61/622,359, filed on Apr. 10, 2012.

(51) Int. Cl.
| | |
|---|---|
| *B05D 3/02* | (2006.01) |
| *C09J 161/14* | (2006.01) |
| *B05D 3/10* | (2006.01) |
| *C08G 8/00* | (2006.01) |
| *B32B 27/42* | (2006.01) |
| *B32B 29/04* | (2006.01) |
| *C08G 8/04* | (2006.01) |
| *C08G 8/06* | (2006.01) |
| *C08G 8/10* | (2006.01) |
| *C09J 161/06* | (2006.01) |

(52) U.S. Cl.
CPC ............. *C09J 161/14* (2013.01); *B05D 3/0254* (2013.01); *B05D 3/108* (2013.01); *B05D 3/02* (2013.01); *C08G 8/00* (2013.01); *B05D 3/10* (2013.01); *B32B 27/42* (2013.01); *B32B 29/04* (2013.01); *C08G 8/04* (2013.01); *C08G 8/06* (2013.01); *C08G 8/10* (2013.01); *C09J 161/06* (2013.01)
USPC ....................................................... 427/342

(58) Field of Classification Search
None
See application file for complete search history.

(56) References Cited

U.S. PATENT DOCUMENTS

| | | | | | |
|---|---|---|---|---|---|
| 1,626,246 | A | * | 4/1927 | Martin | 51/298 |
| 1,771,508 | A | * | 7/1930 | Novotny | 526/71 |
| 2,114,229 | A | * | 4/1938 | Upper et al. | 427/221 |
| 2,740,728 | A | * | 4/1956 | Sonnabend et al. | 427/303 |
| 2,861,977 | A | * | 11/1958 | Baxter et al. | 524/14 |
| 3,244,648 | A | * | 4/1966 | Bornstein | 524/391 |
| 3,949,133 | A | | 4/1976 | Santurri et al. | |
| 4,051,098 | A | * | 9/1977 | Takemura et al. | 502/401 |
| 4,069,276 | A | | 1/1978 | Bornstein | |
| 4,272,581 | A | | 6/1981 | Cooley | |
| 4,283,462 | A | | 8/1981 | Meyer | |
| 4,303,562 | A | | 12/1981 | Hollis, Jr. et al. | |
| 4,400,495 | A | * | 8/1983 | Shutov et al. | 524/176 |
| 4,403,066 | A | * | 9/1983 | Brode et al. | 524/876 |
| 4,430,459 | A | * | 2/1984 | Akerberg et al. | 523/144 |
| 4,469,858 | A | * | 9/1984 | Chen | 528/129 |
| 4,478,269 | A | * | 10/1984 | Akerberg | 164/21 |
| 4,640,934 | A | | 2/1987 | Michel | |
| 6,132,656 | A | | 10/2000 | Dodd | |
| 6,706,845 | B2 | | 3/2004 | Ingram et al. | |
| 2011/0262760 | A1 | | 10/2011 | Breyer et al. | |

FOREIGN PATENT DOCUMENTS

| | | | |
|---|---|---|---|
| EP | 0957129 B1 | | 3/2004 |
| GB | 1153452 | * | 5/1969 |
| GB | 1248349 | * | 9/1971 |
| WO | 82/01509 A1 | | 5/1982 |
| WO | 2008/141201 A1 | | 11/2008 |

OTHER PUBLICATIONS

International Search Report and the Written Opinion of the International Searching Authority for PCT/US2013/035931 mailed Jul. 22, 2013.

* cited by examiner

*Primary Examiner* — Erma Cameron
(74) *Attorney, Agent, or Firm* — Ram W. Sabnis

(57) ABSTRACT

Methods for making and using phenol/formaldehyde/furfural-based resins and furfural alcohol-based resins and are provided. The method for making a phenol/formaldehyde/furfural-based resin can include combining a phenol/formaldehyde-based resin with furfural to produce a phenol/formaldehyde/furfural-based resin. The phenol/formaldehyde/furfural-based resin can have a viscosity of about 1 cP to about 1,000 cP at a temperature of about 25° C.

20 Claims, No Drawings

METHODS FOR MAKING LAMINATED, SATURATED, AND ABRASIVE PRODUCTS

CROSS-REFERENCE TO RELATED APPLICATION

This application claims priority to U.S. Provisional Patent Application Ser. No. 61/622,359, filed on Apr. 10, 2012, which is incorporated by reference herein.

BACKGROUND

1. Field

Embodiments described herein generally relate to methods for making laminated, saturated, and abrasive products. More particularly, such embodiments relate to making laminated, saturated, and abrasive products with furfuryl alcohol-based resins and/or phenol/formaldehyde/furfural-based resins.

2. Description of the Related Art

A variety of paper containing products such as laminated products, e.g., decorative laminates, filtration products, e.g., oil filters, and abrasive products, e.g., sandpaper, require the use of one or more resins in the production thereof. Phenol/formaldehyde-based resins are well-known adhesives that can be used for making such products.

Phenol/formaldehyde-based resins, however, have drawbacks. For example, such resins often contain unreacted or free phenol and/or formaldehyde (volatile organic compounds or "VOCs"), which is undesirable due to environmental and/or health concerns. Additionally, phenol/formaldehyde-based resins often require a substantial amount of solvent, such as methanol, to adjust the viscosity thereof to enable the resin to penetrate/saturate paper so that the resin can be used in laminating, saturating, and abrasive product applications. Another drawback to the presence of the solvent is that solvents such as methanol are VOCs, which adds to the amount of VOCs used in the preparation of the paper containing products.

There is a need, therefore, for improved resins and methods for making and using same in making laminated, saturated, and abrasive products.

SUMMARY

Methods for making and using furfural alcohol-based resins and phenol/formaldehyde/furfural-based resins are provided. In at least one specific embodiment, the method for making a phenol/formaldehyde/furfural-based resin can include combining a phenol/formaldehyde-based resin with furfural to produce the phenol/formaldehyde/furfural-based resin. The phenol/formaldehyde/furfural-based resin can have a viscosity of about 1 cP to about 1,000 cP at a temperature of about 25° C.

In at least one specific embodiment, the method for making a composite product, can include contacting a plurality of substrates with a phenol/formaldehyde/furfural-based resin. The phenol/formaldehyde/furfural-based resin can have a viscosity of about 1 cP to about 1,000 cP at a temperature of about 25° C. The method can also include at least partially curing the phenol/formaldehyde/furfural-based resin to produce a composite product.

In at least one specific embodiment, the method for making a single-ply, resin-saturated product, can include contacting a single cellulosic sheet with a phenol/formaldehyde/furfural-based resin. The phenol/formaldehyde/furfural-based resin has a viscosity of about 1 cP to about 1,000 cP at a temperature of about 25° C. The method can also include at least partially curing the phenol/formaldehyde/furfural-based resin to produce a single-ply resin-saturated product.

In at least one specific embodiment, a method for making a composite product can include contacting a plurality of substrates with a phenol/formaldehyde/furfural-based resin. The method can also include at least partially curing the resin composition to produce a composite product.

In at least one specific embodiment, a method for making a single-ply, resin-saturated product can include contacting a single cellulosic sheet with a phenol/formaldehyde/furfural-based resin. The method can also include at least partially curing the phenol/formaldehyde/furfural-based resin to produce the single-ply resin-saturated product.

In at least one specific embodiment, a method for making a composite product can include contacting a plurality of cellulosic sheets with a furfuryl alcohol-based resin. The method can also include at least partially curing the furfuryl alcohol-based resin to produce a composite product.

In at least one specific embodiment, a method for making a composite product can include contacting a plurality of particulates, fibers, or a combination thereof with a furfuryl alcohol-based resin. The method can also include at least partially curing the furfuryl alcohol-based resin to produce a composite product.

In at least one specific embodiment, a method for making a single-ply, resin-saturated product can include contacting a single cellulosic sheet with a furfuryl alcohol-based resin. The method can also include at least partially curing the furfuryl alcohol-based resin to produce the single-ply, resin-saturated product.

DETAILED DESCRIPTION

The furfuryl alcohol and the furfural can be derived from one or more bio based feedstocks. Illustrative bio based feedstocks can include, but are not limited to, corn cobs, sugar cane bagasse, wood, oats, cottonseed hulls, birchwood, almond hulls, rice hulls, or any combination or mixture thereof. As such, the furfuryl alcohol and furfural can be used as an economical and sustainable source for reactants in the synthesis of resins, e.g., furfuryl alcohol-based resin and phenol/formaldehyde/furfural-based resin. Additionally, the use of such bio based feedstocks in the production of the furfuryl alcohol-based resin and phenol/formaldehyde/furfural-based resin increases the bio-content of the resins and composite products produced therewith. During syntheses of the resins, the furfuryl alcohol and furfural can substantially react rather than volatilizing thereby reducing or limiting the VOCs released into the environment. For example, the furfuryl alcohol-based resin and the phenol/formaldehyde/furfural-based resin produced with furfuryl alcohol and furfural, respectively, made from the bio based feedstocks can be used to produce products meeting the requirements of the USDA BioPreferred® program. An additional benefit of using a furfuryl alcohol-based resin is that it can reduce or limit or eliminate the use of and/or amount of undesirable phenol.

If desired, one or more additional bio based materials such as starches, proteins, sugars, cellulosics, or any combination thereof can be mixed, blended, reacted, or otherwise combined with furfuryl alcohol-based resin and/or the phenol/formaldehyde/furfural-based resin to increase the bio based content thereof. The furfuryl alcohol-based resin can be synthesized from materials that contain about 90% or more, about 92% or more, about 94% or more, about 95% or more, about 96% or more, about 97% or more, about 98% or more, about 98.5% or more, or about 99% or more bio based materials. The phenol/formaldehyde/furfural-based resin made with furfural produced from a bio based feedstock can contain about 5 wt % or more, about 10 wt % or more, about 15 wt % or more, or about 20 wt % or more bio based materials. As such, products such as laminates, saturated, and/or abrasive products made with the furfuryl alcohol-based resin can contain at least 25 wt %, at least 30 wt %, at least 40 wt %, at least 50 wt %, or at least 75 wt %, bio based material or bio based content. Also, laminates, saturated, and/or abrasive products made with the phenol/formaldehyde/furfural-based resin can contain at least 25 wt %, at least 50 wt %, at least 75 wt %, at least 90 wt %, or at least 95 wt % bio based material or bio based content.

The use of furfuryl alcohol and furfural in the production of the furfuryl alcohol-based resin and phenol/formaldehyde/furfural-based resin, respectively, can reduce the concentration of methanol and/or phenol contained therein. For example, the furfuryl alcohol-based resin and the phenol/formaldehyde/furfural-based resin can include less than about 10 wt %, less than about 8 wt %, less than about 6 wt %, less than about 5 wt %, less than about 4 wt %, less than about 3 wt %, less than about 2 wt %, less than about 1 wt %, less than about 0.5 wt %, less than about 0.1 wt %, or less than about 0.05 wt % free methanol. In another example, the furfuryl alcohol-based resin and the phenol/formaldehyde/furfural-based resin can include less than about 10 wt %, less than about 8 wt %, less than about 6 wt %, less than about 5 wt %, less than about 4 wt %, less than about 3 wt %, less than about 2 wt %, less than about 1 wt %, less than about 0.5 wt %, less than about 0.1 wt %, or less than about 0.05 wt % methanol combined therewith. Similarly, the furfuryl alcohol-based resin and the phenol/formaldehyde/furfural/urea-based resin can include less than about 10 wt %, less than about 8 wt %, less than about 6 wt %, less than about 5 wt %, less than about 4 wt %, less than about 3 wt %, less than about 2 wt %, less than about 1 wt %, less than about 0.5 wt %, less than about 0.1 wt %, or less than about 0.05 wt % free phenol. In another example, the furfuryl alcohol-based resin and the phenol/formaldehyde/furfural/urea-based resin can include less than about 10 wt %, less than about 8 wt %, less than about 6 wt %, less than about 5 wt %, less than about 4 wt %, less than about 3 wt %, less than about 2 wt %, less than about 1 wt %, less than about 0.5 wt %, less than about 0.1 wt %, or less than about 0.05 wt % phenol combined therewith. Similarly, the furfuryl alcohol-based resin and the phenol/formaldehyde/furfural-based resin can include less than about 10 wt %, less than about 8 wt %, less than about 6 wt %, less than about 5 wt %, less than about 4 wt %, less than about 3 wt %, less than about 2 wt %, less than about 1 wt %, less than about 0.5 wt %, less than about 0.1 wt %, or about 0.01 wt % free bis-phenol A. In another example, the furfuryl alcohol-based resin and the phenol/formaldehyde/furfural-based resin can include less than about 10 wt %, less than about 8 wt %, less than about 6 wt %, less than about 5 wt %, less than about 4 wt %, less than about 3 wt %, less than about 2 wt %, less than about 1 wt %, less than about 0.5 wt %, less than about 0.1 wt %, or about 0.01 wt % bis-phenol A combined therewith. Similarly, furfuryl alcohol-based resin and the phenol/formaldehyde/furfural-based resin can include less than about 10 wt %, less than about 8 wt %, less than about 6 wt %, less than about 5 wt %, less than about 4 wt %, less than about 3 wt %, less than about 2 wt %, less than about 1 wt %, less than about 0.5 wt %, or less than about 0.1 wt % free urea. In another example, the furfuryl alcohol-based resin and the phenol/formaldehyde/furfural-based resin can include less than about 10 wt %, less than about 8 wt %, less than about 6 wt %, less than about 5 wt %, less than about 4 wt %, less than about 3 wt %, less than about 2 wt %, less than about 1 wt %, less than about 0.5 wt %, or less than about 0.1 wt % urea combined therewith. In another example, the furfuryl alcohol based resin and the phenol/formaldehyde/furfural-based resin can be free from or substantially free from methanol, e.g., less than about 1 wt % free methanol. In another example, the furfuryl alcohol based resin and the phenol/formaldehyde/furfural-based resin can be free from or substantially free from methanol, e.g., less than about 1 wt % free phenol. In another example, the furfuryl alcohol based resin and the phenol/formaldehyde/furfural-based resin can be free from or substantially free from phenol and methanol, e.g., less than about 1 wt % free methanol and less then about 1 wt % free phenol.

The furfuryl alcohol-based resin can be made or produced via any suitable method. For example, the furfuryl alcohol-based resin can be made by polymerizing furfuryl alcohol. The furfuryl alcohol-based resin can be made by polymerizing the furfuryl alcohol in the presence of one or more catalysts. The furfuryl alcohol can polymerize under acidic conditions or under basic conditions with the use of an appropriate catalyst. Suitable catalysts can include, but are not limited to, anhydrides, organic acids, inorganic acids, oxidizers, Lewis acid catalysts, salts of organic and inorganic acids, or any combination thereof. Illustrative anhydrides can include, but are not limited to, maleic anhydride, phthalic anhydride, acetic anhydride, or any combination thereof. Illustrative organic acids can include, but are not limited to, maleic acid, citric acid, formic acid, lactic acid, levulinic acid, phenol sulfonic acid, toluene sulfonic acid, or any combination thereof. Illustrative inorganic acids can include, but are not limited to, sulfuric, hydrochloric, nitric, or any combination thereof. Illustrative oxidizers can include, but are not limited to, hydrogen peroxide, ozone, or any combination thereof. Illustrative amines can include, but are not limited to, ammonia, triethylene tetraamine, diethylene triamine, or any combination thereof. Illustrative Lewis acid catalyst can include, but are no limited to, aluminum chloride, zinc chloride, aluminum bromide, boron fluoride, or any combination thereof.

The furfuryl alcohol and the catalyst can be directed, charged, or otherwise introduced to a reaction vessel to provide a reaction mixture therein. The reaction mixture can be mixed, blended, stirred, or otherwise agitated within the reaction vessel. The reaction mixture can have a concentration of furfuryl alcohol ranging from a low of about 80 wt %, about 90 wt %, or about 95 wt % to a high of about 95 wt %, about 97 wt %, about 99.9 wt %, or about 99.99 wt %, based on the combined weight of the furfuryl alcohol and the catalyst.

Polymerization of the furfuryl alcohol can be carried out at room temperature. For example, the furfuryl alcohol can be mixed with the catalyst and applied directly to the paper with the polymerization reaction occurring in the paper during storage. Polymerization of the furfuryl alcohol can be carried out by heating the reaction mixture to a temperature ranging from a low of about 20° C., about 50° C., or about 70° C. to a high of about 90° C., about 110° C., or about 130° C. In another example, the reaction mixture can be heated to a temperature of about 70° C. to about 100° C., about 75° C. to about 95° C., or about 80° C. to about 90° C. The polymerization of the furfuryl alcohol can be carried out at atmospheric pressure or a pressure greater than atmospheric pressure. The polymerization of the furfuryl alcohol can be carried out for a time ranging from a low of about 1 minute, about 10 minutes, or about 30 minutes to a high of about 8 hours, about 10 hours, or about 20 hours. For example, polymerization of the furfuryl alcohol can be carried out for a time ranging from about 10 minutes to about 240 minutes, about 20 minutes to about 180 minutes, about 10 minutes to about 1 hours, about 1 hour to about 7 hours, or about 2 hours to about 20 hours. The polymerization can be carried out until the furfuryl alcohol-based resin exhibits one or more desired properties. For example, the polymerization of the furfuryl alcohol can be carried out until the furfuryl alcohol-based resin has a desired viscosity.

The viscosity of the furfuryl alcohol-based resin can widely vary. For example, the viscosity of the furfuryl alcohol-based resin can range from a low of about 1 cP, about 100 cP, about 250 cP, about 500 cP, or about 700 cP to a high of about 1,000 cP, about 1,250 cP, about 1,500 cP, about 2,000 cP, or about 2,200 cP at a temperature of about 25° C. In another example, the furfuryl alcohol-based resin can have a viscosity from about 5 cP to about 90 cP, about 85 cP to about 200, about 275 cP to about 400 cP, about 525 cP to about 850 cP, about 675 cP to about 1,100 cP, about 1,050 cP to about 1,700 cP, about 1,300 cP to about 2,100 cP, or about 1,800 cP to about 2,200 cP at a temperature of about 25° C. The viscosity can be determined using a Brookfield Viscometer at a temperature of 25° C. For example, the Brookfield Viscometer can be equipped with a small sample adapter such a 10 mL adapter and the appropriate spindle to maximize torque such as a spindle no. 31.

The viscosity of the furfuryl alcohol-based resin can be adjusted by adding one or more liquid mediums thereto. The liquid medium can be or include one or more polar aprotic solvents, one or more polar protic solvents, or any combination or mixture thereof. Illustrative polar aprotic solvents can include, but are not limited to, tetrahydrofuran ("THF"), dimethyl sulfoxide ("DMSO"), N-methylpyrrolidone ("NMP"), dimethyl acetamide, acetone, or any combination or mixture thereof. Illustrative polar protic solvents can include, but are not limited to, water, methanol, ethanol, propanol, butanol, or any combination or mixture thereof. Other liquid mediums can include ketones such as methyl ethyl ketone.

The furfuryl alcohol based resin can also be neutralized. The neutralized furfuryl alcohol based resin can have a pH ranging from about 6 to about 8. For example, the neutralized furfuryl alcohol based resin can have a pH from a low of about 6, about 6.3, about 6.5, about 6.7, about 6.9, or about 7 to a high of about 7, about 7.2, about 7.3, about 7.5, about 7.7, or about 7.9. The furfuryl alcohol based resin can be neutralized by mixing, blending, or otherwise combining one or more bases therewith. Suitable bases can include, but are not limited to, sodium hydroxide, calcium hydroxide, diethanol amine, triethanolamine, ammonia, or any combination thereof. Neutralizing the furfuryl alcohol based resin can prolong the storage life of the resin.

The furfuryl alcohol-based resin can have a solids concentration ranging from a low of about 20 wt %, about 40 wt %, about 50 wt %, or about 65 wt % to a high of about 75 wt %, about 80 wt %, about 85 wt %, about 95 wt %, or about 99.9 wt %, based on the total weight of the furfuryl alcohol-based resin. In other example, the furfuryl alcohol-based resin can have a solids concentration of about 20 wt % to about 40 wt %, about 40 wt % to about 60 wt %, about 60 wt % to about 80 wt %, about 80 wt % to about 95 wt %, about 25 wt % to about 75 wt %, about 60 wt % to about 90 wt %, or about 75 wt % to about 85 wt %, based on the total weight of the furfuryl alcohol-based resin. In another example, the furfuryl alcohol-based resin can have a solids concentration of at least 80 wt %, at least 82 wt %, at least 84 wt %, at least 86 wt %, at least 88 wt %, or at least 90 wt %, based on the total weight of the furfuryl alcohol-based resin. As used herein, the solids content of the resins, as understood by those skilled in the art, can be measured by determining the weight loss upon heating a small sample, e.g., 1-5 grams of the resin, to a suitable temperature, e.g., 125° C., and a time sufficient to remove the liquid therefrom.

The furfuryl alcohol-based resin can have a concentration of free furfuryl alcohol ranging from a low of about 1 wt %, about 5 wt %, about 10 wt %, or about 20 wt % to a high of about 25 wt %, about 30 wt %, about 40 wt %, or about 50 wt %, based on the total weight of the furfuryl alcohol-based resin. In other example, the furfuryl alcohol-based resin can have a solids concentration of about 1 wt % to about 5 wt %, about 5 wt % to about 10 wt %, about 10 wt % to about 20 wt %, about 20 wt % to about 30 wt %, about 30 wt % to about 40 wt %, or about 40 wt % to about 50 wt %, based on the total weight of the furfuryl alcohol-based resin. The free furfuryl alcohol concentration can be measured using gas chromatography or gas chromatography-mass spectrometry.

The furfuryl alcohol-based resin can have a weight average molecular weight (Mw) ranging from a low of about 200, about 300, or about 400 to a high of about 1,000, about 2,000, or about 6,000. In another example, the furfuryl alcohol-based resin can have a weight average molecular weight ranging from about 250 to about 450, about 450 to about 550, about 550 to about 950, about 950 to about 1,500, about 1,500 to about 2,500, or about 2,500 to about 6,000. In another example, the furfuryl alcohol-based resin can have a weight average molecular weight of about 175 to about 800, about 700 to about 3,330, about 1,100 to about 4,200, about 230 to about 550, about 425 to about 875, or about 475 to about 775.

The furfuryl alcohol-based resin can have a number average molecular weight (Mn) ranging from a low of about 200, about 300, or about 400 to a high of about 1,000, about 2,000, or about 6,000. In another example, the furfuryl alcohol-based resin can have a number average molecular weight ranging from about 250 to about 450, about 450 to about 550, about 550 to about 950, about 950 to about 1,500, about 1,500 to about 2,500, or about 2,500 to about 6,000. In another example, the furfuryl alcohol-based resin can have a number average molecular weight of about 175 to about 800, about 700 to about 3,330, about 1,100 to about 4,200, about 230 to about 550, about 425 to about 875, or about 475 to about 775.

The furfuryl alcohol-based resin can have a z-average molecular weight (Mz) ranging from a low of about 200, about 300, or about 400 to a high of about 1,000, about 2,000, or about 6,000. In another example, the furfuryl alcohol-based resin can have a number average molecular weight ranging from about 250 to about 450, about 450 to about 550, about 550 to about 950, about 950 to about 1,500, about 1,500 to about 2,500, or about 2,500 to about 6,000. In another example, the furfuryl alcohol-based resin can have a number average molecular weight of about 175 to about 800, about 700 to about 3,330, about 1,100 to about 4,200, about 230 to about 550, about 425 to about 875, or about 475 to about 775. Mw, Mn, and Mz can be measured using gel permeation chromatography (GPC), also known as size exclusion chromatography (SEC). This technique utilizes an instrument containing columns packed with porous beads, an elution solvent, and detector in order to separate polymer molecules of different sizes.

The furfuryl alcohol-based resin can have pH ranging from a low of about 1.0, about 2.0, about 3.0, about 4.0, about 5.0, about 6.0, about 7.0 to a high of about 8.0, about 9.0, about 10.0, about 11.0, about 12.0, or about 13.0. In another example, the furfuryl alcohol-based resin can have a pH ranging from about 1 to about 2, about 2 to about 3, about 3 to about 4, about 4 to about 5, about 5 to about 6, about 6 to about 7, about 7 to about 8, about 8 to about 9, about 9 to about 10, about 10 to about 11, about 11 to about 12, or about 12 to about 13.

The furfuryl alcohol-based resin can have a gel time, working life, or pot life ranging from a low of about 2 minutes, about 5 minutes, about 10 minutes, about 30 minutes, or about 1 hour to a high of about 2 hours, about 3 hours, about 5 hours, about 9 hours, about 12 hours, about 24 hours, about 36 hours, about 48 hours or about 72 hours. For example, the furfuryl alcohol-based resin can have a gel time or pot life ranging from about 10 minutes to about 240 minutes, about 20 minutes to about 180 minutes, about 30 minutes to about 4 hours, about 1 hour to about 9 hours, about 2 hours to about 24 hours, about 2 hours to about 12 hours, about 3 hours to about 36 hours, about 24 hours to about 48 hours, or about 48 hours to about 72 hours In another example, the furfuryl alcohol-based resin can have a gel time or pot life less than about 240 minutes or less than about 210 minutes, or less than about 24 hours, but at least 5 minutes, at least 10 minutes, at least 1 hour, at least 2 hours, or at least 6 hours. In at least one specific example, the furfuryl alcohol-based resin can have a pot life ranging from about 80 minutes to about 120 minutes in the winter time or about 1 to about 24 hours in the summer time. In at least one other specific example, the furfuryl alcohol-based resin can have a pot life ranging from about 2 minutes to about 1 hour, about 2 hours to about 12 hours, or about 12 hours to about 72 hours.

Referring to the synthesis of the phenol/formaldehyde/furfural-based resin, the resin can be produced via any suitable process. For example, the phenol/formaldehyde-based resin can be prepared by reacting a molar excess of formaldehyde with phenol under alkaline reaction conditions. Formaldehyde can be used in an amount of ranging from about 0.5 and about 4.5 moles per mole of phenol, with preferred ranges dependent, at least in part, on the intended application or use of the resin. The phenol/formaldehyde-based resin can have a molar ratio of formaldehyde to phenol ranging from a low of about 1:1, about 1.1:1, or about 1.2:1 to a high of about 1.9:1, about 2.1:1, about 2.3:1, or about 2.5:1.

The phenol formaldehyde-based resin can have an amount of free formaldehyde ranging from about 0.1 wt % and about 6 wt %. For example, the phenol-based resin can have a concentration of free formaldehyde ranging from a low of about 0.1 wt %, about 0.5 wt %, about 1 wt %, or about 2 wt % to a high of about 3 wt %, about 5 wt %, or about 6 wt %, based on the total weight of the phenol formaldehyde-based resin.

The phenol formaldehyde-based resin can have an amount of free phenol ranging from about 0.1 wt % and about 20 wt %. For example, the phenol formaldehyde-based resin can have a concentration of free formaldehyde ranging from a low of about 0.1 wt %, about 0.5 wt %, about 1 wt %, or about 2 wt % to a high of about 5 wt %, about 7 wt %, about 10 wt %, or about 15 wt %, based on the total weight of the phenol formaldehyde-based resin.

One or more bases or base compounds can be used to catalyze the polymerization of the phenol and formaldehyde. The base can include, but is not limited to, one or more alkali metal and/or alkali earth hydroxides, such as lithium hydroxide, sodium hydroxide and potassium hydroxide; one or more alkali metal carbonates, such as calcium carbonate, sodium carbonate, and potassium carbonate; and/or one or more amines. For example, the base can be or include an amine, such triethylenetetramine. The catalyst concentrations can range from about 0.2 wt % to about 6 wt %, preferably from about 0.5 wt % to about 3 wt %, based on the combined weight of the phenol, formaldehyde, and catalyst. In one example, at least about 0.005 mol of catalyst per mol of phenol can be used. In another example, an amount of the catalyst can range from about 0.01 mol to about 1 mol per mol of phenol. The catalyst can be added initially to the phenol-formaldehyde reaction mixture or the catalyst can be added incrementally in two or more additions or continuously over time. These materials can be reacted to a suitable endpoint, e.g., a predetermined viscosity. The phenol/formaldehyde-based resin can be cooled under vacuum. The phenol/formaldehyde-based resin can be distilled to remove at least a portion of any water present as a result of the added formaldehyde solution or produced by the polymerization reaction.

The polymerization of the phenol and formaldehyde can be carried out for a time ranging from a low of about 1 minute, about 10 minutes, or about 30 minutes to a high of about 8 hours, about 10 hours, or about 20 hours. For example, polymerization of the phenol and formaldehyde can be carried out for a time ranging from about 10 minutes to about 240 minutes, about 20 minutes to about 180 minutes, about 10 minutes to about 1 hour, about 1 hour to about 7 hours, or about 2 hours to about 20 hours. The polymerization can be carried out until the phenol formaldehyde-based resin exhibits one or more desired properties. For example, the polymerization of the phenol and formaldehyde can be carried out until the phenol formaldehyde-based resin has a desired viscosity.

Urea can be added to the phenol/formaldehyde-based resin to reduce the free formaldehyde content and advantageously impact resin curing. Urea is available in many forms that can be used to make a resin. Solid urea, such as prill, and urea solutions, typically aqueous solutions, can be used. The urea can be added in a range from a low of about 0.1 wt %, about 0.5 wt %, about 1 wt %, or about 2 wt % to a high of about 5 wt %, about 7 wt %, about 10 wt %, or about 15 wt %, based on the total weight of the phenol formaldehyde-based resin. In other example, the urea can be added to phenol/formaldehyde-based resin in a range 0.1 wt % to about 1 wt %, about 1 wt % to about 2 wt %, about 2 wt % to about 5 wt %, about 5 wt % to about 10 wt %, about 10 wt % to about 15 wt %, or about 15 wt % to about 20 wt %, based on the total weight of the phenol/formaldehyde-based resin. The urea can be added to the phenol formaldehyde-based resin at room temperature or at an elevated temperature, e.g., from about 30° C. to about 60° C.

Furfural can be mixed, blended, added, or otherwise combined with the phenol/formaldehyde-based resin to reduce viscosity and/or undergo further polymerization. Reducing the viscosity of the phenol/formaldehyde-based resin can improve the resin's ability to penetrate into a substrate, e.g., a cellulosic sheet and/or a fiber mat. The furfural can be added to the phenol/formaldehyde-based resin in an amount ranging from about 0.1 to about 2.0 moles per mole of phenol. As such, the phenol/formaldehyde/furfural-based resin can have a furfural concentration ranging from a low of about 1 wt %, about 5 wt %, or about 20 wt %, to a high of about 40 wt %, about 50 wt %, or about 60 wt %, based on the weight of the phenol/formaldehyde/furfural-based resin. In another example, the phenol/formaldehyde/furfural-based resin can have a furfural concentration ranging from about 1 wt % to about 5 wt %, about 5 wt % to about 20 wt %, about 20 wt % to about 40 wt %, about 40 wt % to about 50 wt %, about 50 wt % to about 60 wt %, about 3 wt % to about 35 wt %, about 7 wt % to about 45 wt %, or about 10 wt % to about 40 wt %, based on the weight of the phenol/formaldehyde/furfural-based resin. In another example, the phenol/formaldehyde/furfural-based resin can have a furfural concentration ranging from about 1.5 wt % to about 15 wt %, about 3 wt % to about 8 wt %, about 9 wt % to about 15 wt %, about 11 wt % to about 13 wt %, about 7 wt % to about 21 wt %, or about 5 wt % to about 20 wt %, based on the weight of the phenol/formaldehyde/furfural-based resin. The addition of furfural, which can react with the phenol/formaldehyde-based resin can reduce the concentration of free phenol and other volatile phenolic moiety levels of the phenol/formaldehyde/furfural-based resin. Also, as noted above, the use of furfural in the synthesis of the phenol/formaldehyde/furfural-based resin can produce a phenol/formaldehyde/furfural-based resin having a low concentration or no methanol contained therein.

Concurrent with the addition furfural, urea, or if added previously another or second addition of urea, can be added to the phenol/formaldehyde-based resin. The urea can be added in an amount ranging from a low of about 0.1 wt %, about 0.5 wt %, about 1 wt %, or about 2 wt % to a high of about 5 wt %, about 7 wt %, about 10 wt %, or about 15 wt %, based on the total weight of the phenol/formaldehyde/furfural-based resin. In other example, the urea can be added to phenol/formaldehyde-based resin in a range 0.1 wt % to about 1 wt %, about 1 wt % to about 2 wt %, about 2 wt % to about 5 wt %, about 5 wt % to about 10 wt %, about 10 wt % to about 15 wt %, or about 15 wt % to about 20 wt %, based on the total weight of the phenol/formaldehyde/furfural-based resin. In other example, the urea can be added to phenol/formaldehyde-based resin in a range 0.5 wt % to about 4 wt %, about 1 wt % to about 3 wt %, about 1.5 wt % to about 5.5 wt %, about 4.5 wt % to about 8 wt %, about 3.5 wt % to about 10 wt %, or about 5.5 wt % to about 7.5 wt %, based on the total weight of the phenol/formaldehyde/furfural-based resin.

One or more acids and/or one or more bases can be used to polymerize the phenol/formaldehyde/furfural-based resin. The base can include alkali metal and alkali earth hydroxides, alkali metal and alkali earth carbonates, amines, acids, or any combination thereof. Illustrative alkali metal and alkali earth hydroxides can include, but are not limited to, lithium hydroxide, sodium hydroxide and potassium hydroxide. Illustrative alkali metal carbonates can include, but are not limited to, sodium carbonate and potassium carbonate. Illustrative amines can include, but are not limited to, triethylenetetramine and/or GP® 4590 k-20 precatalyst (available from Georgia-Pacific® Chemicals LLC). Illustrative acids can include sulfuric acid, maleic acid, glacial acetic acid, formic acid, urea-phenolsulfonic acid solution, or any combination thereof. The catalyst concentrations can range from about 0.2 wt % to about 6 wt %, preferably from about 0.5 wt % to about 3 wt %, based on the combined weight of the phenol/formaldehyde based resin, furfural, and catalyst. In one example, at least about 0.005 mol of catalyst per mol of phenol can be used, with an amount ranging from about 0.01 to about 1 mol per mol of phenol. The catalyst can be added initially to the phenol-formaldehyde-furfural reaction mixture or the catalyst can be added incrementally in two or more additions or continuously over time.

The viscosity of the phenol/formaldehyde/furfural-based resin can widely vary. For example, the viscosity of the phenol/formaldehyde/furfural-based resin can range from a low of about 1 cP, about 100 cP, about 250 cP, about 500 cP, or about 700 cP to a high of about 1,000 cP, about 1,250 cP, about 1,500 cP, about 2,000 cP, or about 2,200 cP at a temperature of about 25° C. In another example, the phenol/formaldehyde/furfural-based resin can have a viscosity ranging from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol/formaldehyde/furfural-based resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity can be determined using a Brookfield viscometer. For example, the Brookfield Viscometer can be equipped with a small sample adapter such a 10 mL adapter and the appropriate spindle to maximize torque such as a spindle no. 31. If the phenol/formaldehyde/furfural-based resin includes urea, the viscosity of the phenol/formaldehyde/furfural/urea-based resin can be the same as the viscosity of the phenol/formaldehyde/furfural-based resin.

The phenol/formaldehyde/furfural-based resin can have a total solids concentration ranging from a low of about 20 wt %, about 40 wt %, about 50 wt %, or about 65 wt % to a high of about 75 wt %, about 80 wt %, about 85 wt %, about 90 wt %, or about 95 wt %, based on the total weight of the phenol/formaldehyde/furfural-based resin. In another example, the phenol/formaldehyde/furfural-based resin can have a total solids concentration ranging from about 20 wt % to about 50 wt %, about 35 wt % to about 60 wt %, about 45 wt % to about 85 wt %, or about 60 wt % to about 90 wt % based on the total weight of the phenol/formaldehyde/furfural-based resin. If the phenol/formaldehyde/furfural-based resin includes urea, the solids concentration of the phenol/formaldehyde/furfural/urea-based resin can be the same as the solids concentration of the phenol/formaldehyde/furfural-based resin.

The phenol/formaldehyde/furfural-based resin can have a molar ratio of formaldehyde to phenol ranging from a low of about 1:1 to a high of about 5:1. For example, the molar ratio of formaldehyde to phenol in the phenol/formaldehyde/furfural-based resin can range from about 1:1 to about 1.2:1, about 1.2:1 to about 1.4:1, about 1.4:1 to about 1.5:1, about 1.5:1 to about 2:1, about 2:1 to about 3:1, about 3:1 to about 4:1 or about 4:1 to about 5:1. If the phenol/formaldehyde/furfural-based resin includes urea, the molar ratio of formaldehyde to phenol in the phenol/formaldehyde/furfural/urea-based resin can be the same as the molar ratio of formaldehyde to phenol in the phenol/formaldehyde/furfural-based resin.

The phenol/formaldehyde/furfural-based resin can have a weight average molecular weight (Mw) ranging from a low of about 200, about 300, or about 400 to a high of about 1,000, about 2,000, or about 6,000. In another example, the phenol/formaldehyde/furfural-based resin can have a weight average molecular weight ranging from about 250 to about 450, about 450 to about 550, about 550 to about 950, about 950 to about 1,500, about 1,500 to about 2,500, or about 2,500 to about 6,000. In another example, the phenol/formaldehyde/furfural-based resin can have a weight average molecular weight of about 175 to about 800, about 700 to about 3,330, about 1,100 to about 4,200, about 230 to about 550, about 425 to about 875, or about 475 to about 775. If the phenol/formaldehyde/furfural-based resin includes urea, the weight average molecular weight of the phenol/formaldehyde/furfural/urea-based resin can be the same as the weight average molecular weight of the phenol/formaldehyde/furfural-based resin.

The phenol/formaldehyde/furfural-based resin can have a number average molecular weight (Mn) ranging from a low of about 200, about 300, or about 400 to a high of about 1,000, about 2,000, or about 6,000. In another example, the phenol/formaldehyde/furfural-based resin can have a number average molecular weight ranging from about 250 to about 450, about 450 to about 550, about 550 to about 950, about 950 to about 1,500, about 1,500 to about 2,500, or about 2,500 to about 6,000. In another example, the phenol/formaldehyde/furfural-based resin can have a number average molecular weight of about 175 to about 800, about 700 to about 3,330, about 1,100 to about 4,200, about 230 to about 550, about 425 to about 875, or about 475 to about 775. If the phenol/formaldehyde/furfural-based resin includes urea, the number average molecular weight of the phenol/formaldehyde/furfural/urea-based resin can be the same as the number average molecular weight of the phenol/formaldehyde/furfural-based resin.

The phenol/formaldehyde/furfural-based resin can have a z-average molecular weight (Mz) ranging from a low of about 200, about 300, or about 400 to a high of about 1,000, about 2,000, or about 6,000. In another example, the phenol/formaldehyde/furfural-based resin can have a z-average molecular weight ranging from about 250 to about 450, about 450 to about 550, about 550 to about 950, about 950 to about 1,500, about 1,500 to about 2,500, or about 2,500 to about 6,000. In another example, the phenol/formaldehyde/furfural-based resin can have a z-average molecular weight of about 175 to about 800, about 700 to about 3,330, about 1,100 to about 4,200, about 230 to about 550, about 425 to about 875, or about 475 to about 775. If the phenol/formaldehyde/furfural-based resin includes urea, the z-average molecular weight of the phenol/formaldehyde/furfural/urea-based resin can be the same as the z-average molecular weight of the phenol/formaldehyde/furfural-based resin.

The phenol/formaldehyde/furfural-based resin can have pH ranging from a low of about 1, about 2, about 3, about 4, about 5, about 6, about 7 to a high of about 8, about 9, about 10, about 11, about 12, or about 13. In another example, the phenol/formaldehyde/furfural-based resin can have a pH ranging from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13. If the phenol/formaldehyde/furfural-based resin includes urea, the pH of the phenol/formaldehyde/furfural/urea-based resin can be the same as the pH of the phenol/formaldehyde/furfural-based resin.

The phenol/formaldehyde/furfural-based resin can have a gel time, working life, or pot life ranging from a low of about 2 minutes, about 5 minutes, about 10 minutes, about 30 minutes, or about 1 hour to a high of about 2 hours, about 3 hours, about 5 hours, about 9 hours, about 12 hours, about 24 hours, about 36 hours, about 48 hours or about 72 hours. For example, the phenol/formaldehyde/furfural-based resin can have a gel time or pot life ranging from about 10 minutes to about 240 minutes, about 20 minutes to about 180 minutes, about 30 minutes to about 4 hours, about 1 hour to about 9 hours, about 2 hours to about 24 hours, about 2 hours to about 12 hours, about 3 hours to about 36 hours, about 24 hours to about 48 hours, or about 48 hours to about 72 hours In another example, the phenol/formaldehyde/furfural-based resin can have a gel time or pot life less than about 240 minutes or less than about 210 minutes, or less than about 24 hours, but at least 5 minutes, at least 10 minutes, at least 1 hour, at least 2 hours, or at least 6 hours. In at least one specific example, the phenol/formaldehyde/furfural-based resin can have a pot life ranging from about 80 minutes to about 120 minutes in the winter time or about 1 to about 24 hours in the summer time. In at least one other specific example, the phenol/formaldehyde/furfural-based resin can have a pot life ranging from about 2 minutes to about 1 hour, about 2 hours to about 12 hours, or about 12 hours to about 72 hours. The gel time of the phenol/formaldehyde/furfural-based resin can be determined according to any suitable method such as the method(s) discussed and describe above with reference to the furfuryl alcohol-based resin. If the phenol/formaldehyde/furfural-based resin includes urea, the gel time of the phenol/formaldehyde/furfural/urea-based resin can be the same as the gel time or pot life of the phenol/formaldehyde/furfural-based resin.

Pot life denotes the period during which the resin, in whatever stage, is suitable for use in a production process that can include impregnation, manipulation, hardening, and curing steps. Examples of such processes include processes that require saturation of a substrate with resin. Saturation of paper, such as kraft paper for formation of laminates and other papers, such as to form treated filters, is a particular example of such processes. After the impregnation and manipulation steps, the resin may be hardened, or cured. Some applications require adequate 'shelf life' of the resin-saturated substrate. Such an application requires that, during advancement, the B-staged, resin-saturated substrate be shelf-stable, i.e., afford the opportunity to keep the resin impregnated into the substrate at the B-stage. The 'shelf life' is the period during which the resin remains in the B-stage. Thus, it is desired that the resin advance to B-stage quickly and have adequate shelf life at B-stage. Then, when the resin is again advanced, it should harden and cure quickly.

One illustrative process that can be modified to produce a phenol/formaldehyde/furfural-based resin can be similar to the process discussed and described in U.S. Pat. No. 6,706,845. For example, in making the phenol/formaldehyde-based resin, the synthesis of the phenol/formaldehyde-based resin can be modified by replacing the addition of methanol with the addition of furfural.

One or more acids, bases, heat, and/or pressure can be added, mixed, blended, or otherwise combined with the furfuryl alcohol-based resin and/or the phenol/formaldehyde/furfural-based resin prior to, during, and/or after application of the furfuryl alcohol-based resin and/or the phenol/formaldehyde/furfural-based resin to one or more substrates or particulates. The acid, base, heat, and/or pressure can initiate or start and/or accelerate the at least partial curing of the resin.

The amount of acid that can be added to the furfuryl alcohol-based resin or the phenol/formaldehyde/furfural-based resin to initiate or start curing of the resin can range from a low of about 0.01 wt %, about 1 wt %, about 3 wt %, or about 5 wt % to a high of about 30 wt %, about 40 wt %, about 45 wt %, or about 50 wt %, based on the combined weight of the resin and the acid. For example, the amount of acid that can be added to the furfuryl alcohol-based resin or the phenol/formaldehyde/furfural-based resin to initiate or start curing of the resin can range from about 0.1 wt % to about 15 wt %, about 10 wt % to about 25 wt %, about 5 wt % to about 35 wt %, about 25 wt % to about 40 wt %, or about 20 wt % to about 50 wt %, based on the combined weight of the resin and the acid.

The amount of base that can be added to the furfuryl alcohol-based resin or the phenol/formaldehyde/furfural-based resin can range from a low of about 0.01 wt %, about 1 wt %, about 3 wt %, or about 5 wt % to a high of about 30 wt %, about 40 wt %, about 45 wt %, or about 50 wt %, based on the combined weight of the resin and the base. For example, the amount of base that can be added to furfuryl alcohol-based resin or the phenol/formaldehyde/furfural-based resin can range from about 0.1 wt % to about 15 wt %, about 10 wt % to about 25 wt %, about 5 wt % to about 35 wt %, about 25 wt % to about 40 wt %, or about 20 wt % to about 50 wt %, based on the combined weight of the resin and the base.

The amount of catalyst that can be added to the furfuryl alcohol-based resin or the phenol/formaldehyde/furfural-based resin to initiate or start curing of the resin can range from a low of about 0.01 wt %, about 1 wt %, about 3 wt %, or about 5 wt % to a high of about 30 wt %, about 40 wt %, about 45 wt %, or about 50 wt %, based on the combined weight of the resin and the catalyst. For example, the amount of catalyst that can be added to the furfuryl alcohol-based resin or the phenol/formaldehyde/furfural-based resin to initiate or start curing of the resin can range from about 0.1 wt % to about 15 wt %, about 10 wt % to about 25 wt %, about 5 wt % to about 35 wt %, about 25 wt % to about 40 wt %, or about 20 wt % to about 50 wt %, based on the combined weight of the resin and the catalyst.

Suitable acids that can be used to at least partially cure the resins can include, but are not limited to, one or more organic acids, one or more inorganic acids, or any combination thereof. Illustrative inorganic acids can include, but are not limited to, sulfuric acid, ammonium sulfate, or any combination thereof. Illustrative organic acids can include, but are not limited to, maleic acid, lactic acid, acetic acid, formic acid, a urea/phenolsulfonic acid, toluene sulfonic acid, or any combination thereof.

Suitable bases that can be used to at least partially cure the resins can include, but are not limited to, organic bases, inorganic bases, or any combination thereof. Illustrative inorganic bases can include, but are not limited to, sodium hydroxide, ammonium hydroxide, potassium hydroxide, triethylene tetraamine, diethylene triamine, or any combination thereof. Illustrative organic bases can include, but are not limited to, triethylamine, urea, GPO 4590 k-20 precatalyst, made by Georgia-Pacific Chemicals LLC, or any combination thereof.

Suitable catalysts that can be used to at least partially cure the resins can include, but are not limited to, one or more metal salts, or any combination thereof. Illustrative metal salts can include, but are not limited to, salts of sodium, potassium, aluminum, magnesium, zinc, or any combination thereof. For example, the catalyst can be or include sodium nitrate, aluminum sulfate, ammonium hydrogen phosphate, ammonium persulfate, ammonium chloride, ammonium nitrate, ammonium sulfate, or any combination thereof.

In one or more embodiments, one or more additives or additional materials can be added to the furfuryl alcohol-based resin or the phenol/formaldehyde/furfural-based resin compositions. The additive(s) can be added to the mixture of furfuryl alcohol and catalyst, after the furfuryl alcohol-based resin has been produced, and/or after the furfuryl alcohol-based resin has been isolated from at least a portion of any unreacted catalyst. The additive(s) can be added to the mixture of phenol/formaldehyde-based resin and furfural, after the phenol/formaldehyde/furfural-based resin has been produced, and/or after the phenol/formaldehyde/furfural-based resin has been isolated from at least a portion of any unreacted furfural. Illustrative additives can include, but are not limited to, waxes or other hydrophobic additives, water, filler material(s), extenders, surfactants, release agents, dyes, fire retardants, formaldehyde scavengers, biocides, or any combination thereof. Suitable extenders can include, but are not limited to, one or more starches and/or one or more sugars. A preferable extender can be or include ECOSHPERE®, made by Ecosynthetix, Inc. A preferable surfactant can be or include SURFYNOL® made by Air Products and Chemicals, Inc.

If the furfuryl alcohol-based resin and/or the phenol/formaldehyde/furfural/urea resin includes one or more additional additives, the amount of each additive can range from a low of about 0.001 wt %, about 0.01 wt %, about 0.1 wt %, about 1 wt %, or about 5 wt % to a high of 20 wt %, about 30 wt %, about 40 wt %, or about 50 wt %, based on the weight of the furfuryl alcohol-based resin and/or the phenol/formaldehyde/furfural/urea resin. For example, if the furfuryl alcohol-based resin and/or the phenol/formaldehyde/furfural/urea resin includes additional additives, the amount of each additive can range from about 0.01 wt % to about 5 wt %, about 1 wt % to about 10 wt %, about 5 wt % to about 40 wt %, about 0.01 wt % to about 50 wt %, about 2 w % to about 20 wt %, about 15 wt % to about 45 wt %, or about 1 wt % to about 15 wt %, based on the weight of the furfuryl alcohol-based resin and/or the phenol/formaldehyde/furfural/urea resin.

The composite product can be made by contacting one or more substrates with the furfuryl alcohol-based resin and/or the phenol/formaldehyde/furfural-based resin, and at least partially curing the resin(s) to produce a product. As mentioned above, the resins can be cured via a number of methods, e.g., with the addition of one or more acids, bases, and/or catalysts, the application of heat, and/or pressure, or any combination thereof, to produce the composite product. The resulting product can be or include a single substrate or a laminate of two or more substrates. Single substrates saturated with the resin(s) can be used to produce products such as oil filters, overlays, electrical laminates, and/or paint roller tubes.

The one or more substrates can be or include cellulosic sheets, cotton fabrics, e.g., paper sheets and/or kraft sheets. The one or more substrates can also be or include fibers, e.g., glass fibers. The cellulosic sheets of the substrate can include cellulose fibers from the group consisting of substantially delignified cellulose fibers, including pulped fibers, "chemical pulps," "thermomechanical pulps," recycled pulp fiber, bleached and unbleached paper and paper-like materials, non-woven mats, sheets or felts, and the like. The origin of the delignified cellulose can be derived from any of a large variety of sources, including wood and various other plant fibers, such as from agricultural by-products, and also including recycled cellulose. Delignified celluloses are characterized as having had most to substantially all the indigenous lignin and analogous naturally-occurring binders removed. Preferably, a majority of the cellulosic material in the substrate, e.g., 90% or 95% or more, consists of fibers from the above group, although blends of fibers may be used.

The term "kraft paper" refers to paper produced by the kraft process. The kraft process includes treating wood chips with a mixture of sodium hydroxide and/or sodium sulfide to break the bonds between the lignin and the cellulose contained in the wood chips to form or produce a wood pulp. Most of the lignin, i.e., greater than 50% of the lignin, in the wood chips can be separated from the cellulose to provide cellulose fibers that can then be formed into kraft paper. Such sheets can be manufactured in a number of basis-weight grades, ranging from about 30 lb basis weight (30 lb/1,000 ft$^2$) to about 200 lb basis weight (90 lb/1,000 ft$^2$).

As used herein, the terms "curing," "cured," and similar terms are intended to refer to the structural and/or morphological change that occurs in the binder composition as it is cured to cause covalent chemical reaction (crosslinking), ionic interaction or clustering, improved adhesion to a substrate, phase transformation or inversion, and/or hydrogen bonding. As used herein, the phrases "at least partially cure," "at least partially cured," and similar terms are intended to refer to a binder composition that has undergone at least some covalent chemical reaction (crosslinking), ionic interaction or clustering, improved adhesion to the substrate, phase transformation or inversion, and/or hydrogen bonding, but may also be capable of undergoing additional covalent chemical reaction (crosslinking), ionic interaction or clustering, improved adhesion to the substrate, phase transformation or inversion, and/or hydrogen bonding.

The laminated product can include a plurality of substrates that have been saturated with the furfuryl alcohol-based resin and/or the phenol/formaldehyde/furfural-based resin, where the furfuryl alcohol-based resin and/or the phenol/formaldehyde/furfural-based resin has been at least partially cured. The laminate can also be or include a core section, a pigmented or printed decorative paper sheet, and an overlay. The core section can include a plurality of paper sheets. For example, the core section can be a plurality of kraft paper sheets. The pigmented or decorative paper sheet can be a single sheet of paper having a decorative image thereon. The overlay can be a layer of rayon and/or paper. The core section, the pigmented or decorative paper sheet, and the overlay can each be at least partially saturated with the furfuryl alcohol-based resin and/or the phenol/formaldehyde/furfural-based resin. The furfuryl alcohol-based resin and/or the phenol/formaldehyde/furfural-based resin can be at least partially cured to produce the laminate.

In making the laminate product, the substrate(s), e.g., paper sheet(s), can pass through a dip tank generally filled with a solution of the furfuryl alcohol-based resin and/or the phenol/formaldehyde/furfural-based resin. The substrate can be saturated or "impregnated" with the resin during immersion in the tank. Excess resin can be removed from the substrate by opposed scraper bars or blades as the substrate leaves the dip tank. The resin-saturated or resin-impregnated substrates can then be moved to a drying zone to evaporate volatile components, such as solvents, and/or increase the molecular weight of the resin(s). For example, a resin-saturated decorative paper and a resin-saturated core kraft paper can be passed through one or more ovens. This juncture is conventionally called the "B-Stage." The B-stage can reduce the weight of the resin composition in amount ranging from about 1 wt % to about 15 wt % or about 5 wt % to about 10 wt %. However, the water content of the furfuryl alcohol-based resin and/or the phenol/formaldehyde/furfural-based resin can be low enough that further drying of resin can be unnecessary. Said another way, the water content of the furfuryl alcohol-based resin and/or the phenol/formaldehyde/furfural-based resin can be low enough that the B-staging process can be avoided. The resin-saturated substrates can be removed from the drying zone and cut to size, stacked, and consolidated using a heated, high-pressure press. The resin-saturated substrates can be laid up to a desired number of plies. The resin-saturated stacked sheets or plies can be pressed to a pressure ranging from about 3,000 kPa to about 15,000 kPa, e.g., about 5,500 kPa to about 10,500 kPa. The resin-saturated substrates can be heated to a temperature ranging from a low of about −7° C., about 35° C. about 60° C., about 100° C. or about 120° C. to a high of about 205° C., about 230° C., about 245° C., or about 260° C. In another example, the resin-saturated substrates can be heated to a temperature ranging from about −7° C. to about 38° C., about 38° C. to about 121° C., about 121° C. to about 232° C., about 232° C. to about 260° C., about 30° C. to about 60° C., about 40° C. to about 200° C., about 100° C. to about 250° C., or about 120° C. to about 200° C. The resin-saturated substrates can be pressed for a time ranging from a low of about 1 minute, about 15 minutes, or about 30 minutes or to a high of about 90 minutes, about 120, or about 150 minutes. In another example, the resin-saturated substrates can be pressed for a time of about 1 minute to about 15 minutes, about 15 minutes to about 30 minutes, about 30 minutes to about 60 minutes, about 60 minutes to about 90 minutes, about 90 minutes to about 120 minutes, about 120 minutes to about 150 minutes, about 2 minutes to about 25 minutes, about 5 minutes to about 80 minutes, or about 40 minutes to about 110 minutes. While in the press, the resin can sufficiently flow to displace at least a portion of any air present between the plies and undergo at least partial curing to produce the composite product. After heating and/or pressing the resin-saturated substrates, the heated and/or pressed substrates can be cooled. For example, the resin-saturated substrates can be cooled, at pressure, to room temperature.

The resin-saturated substrates can contain an amount of the furfuryl alcohol-based resin and/or the phenol/formaldehyde/furfural-based resin ranging from a low of about 0.1 wt %, about 1 wt %, about 10 wt %, or about 20 wt % to a high of about 70 wt %, about 80 wt %, about 90 wt %, or about 99 wt %, based on the weight of the resin-saturated substrates. For example, the resin-saturated substrates can contain an amount of the furfuryl alcohol-based resin and/or the phenol/formaldehyde/furfural-based resin ranging from about 0.1 wt % to about 5 wt %, about 5 wt % to about 15 wt %, about 15 wt % to about 25 wt %, about 25 wt % to about 35 wt %, about 35 wt % to about 55 wt %, about 55 wt % to about 65 wt %, about 65 wt % to about 75 wt %, about 75 wt % to about 85 wt %, about 85 wt % to about 95 wt %, or about 95 wt % to about 99 wt %, based on the weight of the resin-saturated substrates.

The laminates can be sanded, cut to size, and/or otherwise additionally finished or processed for use as decorative surfaces for desktops, tabletops, wall panels and the like. The laminate can be glued to a base substrate such as particleboard with adhesives such as contact cement or urea-based adhesives. The laminates can be provide a flat surface or the laminates can be made in such a manner so as to render them post-formable by the application of heat. Post formable laminates can be used to form counter tops where the front edge is formed into a lip and the back edge is formed up into a back-splash area. Post-forming laminates can be made by under-curing in the heated, high-pressure press.

The furfuryl alcohol-based resin and/or the phenol/formaldehyde/furfural-based resin can be used to produce laminate products via conventional or accelerated batch processes. The furfuryl alcohol-based resin and/or the phenol/formaldehyde/furfural-based resin can also be used to produce laminate products via continuous, low-pressure laminating processes.

The viscosity of the furfuryl alcohol-based resin and/or the phenol/formaldehyde/furfural-based resin can be adjusted to provide a resin having a viscosity suitable for continuous, high-speed laminating processes. The viscosity of the resins can be adjusted, for example, via the addition of one or more water-soluble organic solvents. Suitable organic solvents include alcohols, e.g., methanol, ethanol, and isopropyl alcohol, and ketones, e.g., acetone and methyl ethyl ketone. A preferred organic solvent is methanol. The solvent can be added to the resin at any time. For example, the organic solvent can be added before saturating the substrate with the resin. Preferably, the organic solvent is added at the end of the resin's synthesis, such as when the resin is being cooled. An effective amount of organic solvent can be added to adjust the viscosity of the resin. For example, viscosities can range from a low of about 10 cP, about 100 cP, about 250 cP or about 300 cP to a high of about 750 cP, about 800 cP, about 1,000 cP, about 2,000 cP, or about 3,000 cP. In another example, the resin's viscosity can be adjusted to a range of about 15 cP to about 150 cP, about 150 cP to about 350 cP, about 350 cP to about 750 cP, about 750 cP to about 900 cP, or to about 900 cP to about 1,000 cP. The furfuryl alcohol-based resin and/or the phenol/formaldehyde/furfural-based resin can have a concentration of the organic solvent ranging from a low of about 5 wt %, about 20 wt %, or about 30 wt % to a high of about 50 wt %, about 60 wt %, or about 75%, based on the total weight of the furfuryl alcohol-based resin and/or the phenol/formaldehyde/furfural-based resin. In another example, the amount of the organic solvent in the furfuryl alcohol-based resin and/or the phenol/formaldehyde/furfural-based resin can range from about 7 wt % to about 25 wt %, about 25 wt % to about 35 wt %, about 35 wt % to about 55 wt %, about 55 wt % to about 65 wt %, or about 65 wt %, to about 75%, based on the total weight of the furfuryl alcohol-based resin and/or the phenol/formaldehyde/furfural-based resin.

The furfuryl alcohol-based resin and/or the phenol/formaldehyde/furfural-based resin can include water. For example, the furfuryl alcohol-based resin and/or the phenol/formaldehyde/furfural-based resin can have a concentration of water ranging from a low of about 0.1 wt %, about 1 wt %, about 10 wt %, or about 20 wt % to a high of about 70 wt %, about 80 wt %, about 90 wt %, or about 99 wt %, based on the weight of the resin. In another example, the amount of water in the furfuryl alcohol-based resin and/or the phenol/formaldehyde/furfural-based resin can range from about 0.1 wt % to about 5 wt %, about 5 wt % to about 15 wt %, about 15 wt % to about 25 wt %, about 25 wt % to about 35 wt %, about 35 wt % to about 55 wt %, about 55 wt % to about 65 wt %, about 65 wt % to about 75 wt %, about 75 wt % to about 85 wt %, about 85 wt % to about 95 wt %, or about 95 wt % to about 99 wt %, based on the weight of the resin.

The furfuryl alcohol-based resin and/or the phenol/formaldehyde/furfural-based resin that can be applied to the substrate can have a widely varying solids concentration. For example, the solids concentration of the furfuryl alcohol-based resin and/or the phenol/formaldehyde/furfural-based resin can range from about 1 wt % to about 99 wt %. In another example, the furfuryl alcohol-based resin and/or the phenol/formaldehyde/furfural-based resin can have a solids concentration ranging from a low of about 5 wt %, about 20 wt %, or about 30 wt % to a high of about 50 wt %, about 60 wt %, about 75 wt %, or about 99 wt %, based on the total weight of the furfuryl alcohol-based resin and/or the phenol/formaldehyde/furfural-based resin. In another example, the total solids content can be in the range of about 7 wt % to about 25 wt %, about 25 wt % to about 40 wt %, about 40 wt % to about 65 wt %, about 65 wt % to about 75 wt %, or about 75 wt % to about 95 wt %, based on the total weight of the furfuryl alcohol-based resin and/or the phenol/formaldehyde/furfural-based resin. In another example, the furfuryl alcohol-based resin can have a total solids content of about 90 wt % or more, about 95 wt % or more, about 98 wt % or more, about 99 wt % or more, about 99.5 wt % or more, about 99.9 wt % or more, or about 100 wt %.

Additional organic solvent can be added, as necessary, to maintain the solubility of the furfuryl alcohol-based resin and/or the phenol/formaldehyde/furfural-based resin. Alternatively, water-borne furfuryl alcohol-based resin and/or phenol/formaldehyde/furfural-based resin can be added. The water-borne resins can be similar to the solvent-borne resins except for the lack of an organic solvent and the water-borne resins can be lower in molecular weight than their organic solvent-borne counterparts. This can be done to achieve an acceptable degree of penetration into the core paper sheets.

For applying to a paper substrate the pH of the furfuryl alcohol-based resin and/or phenol/formaldehyde/furfural-based resin can have pH ranging from a low of about 1, about 2, about 3, about 4, about 5, about 6, about 7 to a high of about 8, about 9, about 10, about 11, about 12, or about 13. In another example, the furfuryl alcohol based-resin and/or phenol/formaldehyde/furfural-based resin that is applied to a paper substrate can have a pH ranging from about 1 to about 2, about 2 to about 3, about 3 to about 4, about 4 to about 5, about 5 to about 6, about 6 to about 7, about 7 to about 8, about 8 to about 9, about 9 to about 10, about 10 to about 11, about 11 to about 12, or about 12 to about 13. Lower pH can help reduce the degree of resin cure and/or reduce laminate brittleness, but too low of a pH can increase the degree of cure of the melamine/formaldehyde-based resin-saturated surface sheet at the interface.

One or more aqueous polymer dispersions can be added to the furfuryl alcohol-based resin and/or the phenol/formaldehyde/furfural-based resin. The addition of the aqueous polymer dispersion can increase the flexibility of the resin-saturated substrate. Suitable aqueous polymer dispersion can include acrylate, methacrylate, vinyl acetate homopolymers, styrene/acrylate polymer, styrene/methacrylate polymer, polybutadiene/styrene polymers, or any combination thereof. If present, the aqueous polymer dispersion can be added in an amount ranging from about 0.1 wt %, about 1 wt %, about 5 wt %, or about 15 wt % to a high of about 25 wt %, about 35 wt %, or about 50 wt %, based on the total weight of the furfuryl alcohol-based resin and/or the phenol/formaldehyde/furfural-based resin and the aqueous polymer dispersion. In another example, the aqueous polymer dispersion range from about 0.5 wt % to about 3 wt %, about 3 wt % to about 12 wt %, about 12 wt % to about 30 wt %, about 30 wt % to about 40 wt %, or about 40 wt % to about 50 wt %, based on the total weight of the furfuryl alcohol-based resin and/or the phenol/formaldehyde/furfural-based resin and the aqueous polymer dispersion.

A plasticizer such as a thermoplastic latex can be added to the furfuryl alcohol-based resin or the phenol/formaldehyde/furfural-based resin to give the treated paper pleatability. One or more lubricants can also be added to the furfuryl alcohol-based resin and/or the phenol/formaldehyde/furfural-based resin to facilitate or promote the release of the laminate from the pressure rolls.

One or more amides and/or surfactants can be added to the furfuryl alcohol-based resin and/or the phenol/formaldehyde/furfural-based resin. Adding a surfactant to the furfuryl alcohol-based resin and/or the phenol/formaldehyde/furfural-based resin can improve the penetration ability or penetration characteristics of the resin(s). Illustrative surfactants can include, but are not limited to, a material selected from the group consisting of formamide, N-methyl formamide, N,N-dimethyl formamide, N-ethyl formamide, N,N-diethyl formamide, N,N-diphenyl formamide and N-methyl formanilide can be included in the resin composition. In one example, formamide can be combined with the furfuryl alcohol-based resin and/or the phenol/formaldehyde/furfural-based resin. The amide can be added to the furfuryl alcohol-based resin and/or the phenol/formaldehyde/furfural-based resin in an amount ranging from a low of about 0.5 wt %, about 1 wt %, or about 2 wt % to a high of about 5 wt %, about 10 wt %, or about 15 wt %, based on the total weight of the furfuryl alcohol-based resin and/or the phenol/formaldehyde/furfural-based resin. Illustrative surfactants include SURFYNOL® or sodium dodecyl sulfate. The surfactant can be added to the resin at any time. For example, the surfactant can be added to the resin just prior to paper saturation in amounts ranging from a low of about 0.01 wt %, about 1 wt %, about 2 wt %, or about 5 wt % to a high of about 7 wt %, 10 wt %, or about 15%, based on the weight of the furfuryl alcohol-based resin and/or the phenol/formaldehyde/furfural-based resin and the surfactant. The resin penetration can be achieved without increasing the relative amount of organic solvent in the resin. The ability to achieve a balanced ratio of water to organic solvent can be important because a higher organic solvent content can detrimentally lower the flash point of the resin composition while a higher water content (which raises the flash point) can detrimentally affect the penetration rate of the resin into the paper. By including formamide or an equivalent with the resin, a reduction in the amount of organic solvent relative to water can be achieved while maintaining the resin's penetration characteristics. For example, an enhanced penetration can be provided without an undesirable lowering of the flash point of the laminating resin.

The furfuryl alcohol-based resin and/or the phenol/formaldehyde/furfural-based resin can also be used to make one or more abrasives or abrasive products. Abrasive products can be used to remove burrs or flashes on moldings such as molded electronic parts, plastic products, etc., for satin- or matte-finishing mold surfaces, and/or smoothing any number of other surfaces/materials. Abrasive products can be made by contacting a plurality of particulates with the furfuryl alcohol-based resin and/or the phenol/formaldehyde/furfural-based resin and, at least partially, curing to produce a composite product.

The preferred particulates are selected from the group consisting of fused aluminum oxide, ceramic aluminum oxide, sol gel alumina-based ceramics, silicon carbide, glass, ceria, glass ceramics, fused alumina-zirconia, natural crushed aluminum oxide, heat treated aluminum oxide, zirconia, garnet, emery, cubic boron nitride, diamond, hard particulate polymeric materials, metals and combinations and agglomerates thereof.

The average particulate size can range from about a low of about 1 μm, about 10 μm, about 25 μm, or about 50 μm to a high of about 250 μm, about 500 μm, about 1,000 μm, about 1,300 μm, or about 1,800 μm. For example, the average particulate size can range from about 2 μm to about 750 μm or about 5 μm to about 550 μm. The size of the particulates is typically specified to be the longest dimension of the abrasive particle. In most cases there will be a range distribution of particle sizes. In some instances it can be preferred that the particulate size distribution be tightly controlled such that the resulting abrasive article provides a consistent surface finish on the workpiece being abraded.

The particulates can be contacted with the furfuryl alcohol-based resin and/or the phenol/formaldehyde/furfural-based resin by spraying, coating, mixing, brushing, falling film or curtain coater, dipping, soaking, or the like. The particulates may be uniformly dispersed in the resin or alternatively the particulates may be non-uniformly dispersed therein. It is preferred that the particulates are uniformly dispersed in the binder so that the resulting abrasive product has a more consistent cutting ability.

The abrasive products can include one or more fillers. The filler can be material of any shape, regular, irregular, elongate, plate-like, rod-shaped and the like with an average particle size ranging from a low of about 0.001 μm, about 0.01 μm, about 0.1 μm, about 1 μm, or about 3 μm to a high of about 10 μm, about 20 μm, about 30 μm, about 40 μm, or about 50 μm. Fillers can function as diluents, lubricants, grinding aids, and/or additives to aid powder flow. Illustrative fillers can include, but are not limited to, metal carbonates, e.g., calcium carbonate, calcium magnesium carbonate, sodium carbonate, and/or magnesium carbonate, silica, e.g., quartz, glass beads, glass bubbles, and/or glass fibers, silicates, e.g., talc, clays, montmorillonite, feldspar, mica, calcium silicate, calcium metasilicate, sodium aluminosilicate, and/or sodium silicate, metal sulfates, e.g., calcium sulfate, barium sulfate, sodium sulfate, aluminum sodium sulfate, and/or aluminum sulfate, gypsum, vermiculite, sugar, wood flour, aluminum trihydrate, carbon black, metal oxides, e.g., calcium oxide, aluminum oxide, tin oxide, and/or titanium dioxide, metal sulfites, e.g., calcium sulfite, thermoplastic particles, e.g., polycarbonate, polyetherimide, polyester, polyethylene, poly(vinylchloride), polysulfone, polystyrene, acrylonitrile-butadiene-styrene block copolymer, polypropylene, acetal polymers, polyurethanes, and/or nylon particles, and thermosetting particles, e.g., phenolic bubbles, phenolic beads, and/or polyurethane foam. The filler and also be a salt such as a halide salt. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metal fillers include, tin, lead, bismuth, cobalt, antimony, cadmium, iron and titanium. Other miscellaneous fillers include sulfur, organic sulfur compounds, graphite, lithium stearate and metallic sulfides.

The particulates contacted with the furfuryl alcohol-based resin and/or the phenol/formaldehyde/furfural-based resin or simply "particulate/resin mixture" can be formed into a desired shape. The particulate/resin mixture can be formed into a desired shape before, during, and/or after the resin is, at least partially, cured. For example, the particulate/resin mixture can be consolidated or otherwise formed into a desired shape, or if desired pressed to a particular density and thickness, and heated to, at least partially, cure the resin. For obtaining spherical particles, a jet crusher, in which the particles are forced to impinge against one another, can be used. Preferably, the particle shape can be as close to spherical as possible for the betterment of abrasive properties.

The particulate/resin mixture can be placed onto a backing material. Any of a variety of backing materials can be suitable for the abrasive product, including both flexible backings and backings that are more rigid. Examples of typical flexible abrasive backings include polymeric film, primed polymeric film, metal foil, woven fabrics, knit fabrics, stitchbonded fabrics, paper, vulcanized fiber, nonwoven fabrics, calendered nonwoven fabrics, and treated versions thereof and combinations thereof. Suitable less flexible backings include vulcanized fibre, stiff polymeric backings, glass or metal fabrics or sheets, and metal or ceramic plates. The thickness of a backing generally ranges between about 0.03 mm to about 50 mm and preferably between about 0.05 mm to about 10 mm. Alternatively, the backing may be fabricated from a porous material such as a foam, including open or closed cell foam, and combinations thereof.

The particulates contacted with the furfuryl alcohol-based resin or the phenol/formaldehyde/furfural-based resin can be deodorized and cleared of fine powdery particles by washing in water. Removal of fine powders can contribute to an improvement of abrading performance or a betterment of working environment and workability of the composition. Water washing can be carried out after crushing of the cured resin composition. The crushed composition can be immediately washed with water, or it can be sieved to collect the particles in a predetermined size range before water washing. The latter is preferred for better working efficiency. Warm or hot water can be used for water washing. Drying can be performed at room temperature or at higher temperatures, such as about 60° C. or about 180° C.

As used herein, the terms "fiber," "fibrous," "fiberglass," "fiber glass," "glass fibers," and the like are used interchangeably and refer to materials that have an elongated morphology exhibiting an aspect ratio (length to thickness) of greater than 100, generally greater than 500, and often greater than 1000. Indeed, an aspect ratio of over 10,000 is possible. Suitable fibers can be glass fibers, natural fibers, synthetic fibers, mineral fibers, ceramic fibers, metal fibers, carbon fibers, or any combination thereof. Illustrative glass fibers can include, but are not limited to, A-type glass fibers, C-type glass fibers, E-type glass fibers, S-type glass fibers, ECR-type glass fibers, wool glass fibers, and any combination thereof. The term "natural fibers," as used herein refers to plant fibers extracted from any part of a plant, including, but not limited to, the stem, seeds, leaves, roots, or phloem. Illustrative natural fibers can include, but are not limited to, cotton, jute, bamboo, ramie, bagasse, hemp, coir, linen, kenaf, sisal, flax, henequen, and any combination thereof. Illustrative synthetic fibers can include, but are not limited to, synthetic polymers, such as polyester, polyamide, aramid, and any combination thereof. In at least one specific embodiment, the fibers can be glass fibers that are wet use chopped strand glass fibers ("WUCS"). Wet use chopped strand glass fibers can be formed by conventional processes known in the art. The WUCS can have a moisture content ranging from a low of about 5%, about 8%, or about 10% to a high of about 20%, about 25%, or about 30%.

Prior to using the fibers to make a fiberglass product, the fibers can be allowed to age for a period of time. For example, the fibers can be aged for a period of a few hours to several weeks before being used to make a fiberglass product. For fiberglass mat products the fibers can typically be aged for about 3 to about 30 days. Ageing the fibers includes simply storing the fibers at room temperature for the desired amount of time prior to being used in making a fiberglass product.

In one or more embodiments, a method for binding loosely associated, non-woven mat or blanket of fibers can include, but is not limited to (1) contacting the fibers with the furfuryl alcohol-based resin and/or the phenol/formaldehyde/furfural-based resin and (2) heating the resin to an elevated temperature, which temperature is sufficient to at least partially cure the resin. For example, the furfuryl alcohol-based resin and/or phenol/formaldehyde/furfural-based resin can be cured at a temperature ranging from about 75° C. to about 300° C., usually at a temperature between about 100° C. and up to a temperature of about 250° C. The furfuryl alcohol-based resin and/or phenol/formaldehyde/furfural-based resin can be cured at an elevated temperature for a time ranging from about 1 second to about 15 minutes. The particular curing time can depend, at least in part, on the type of oven or other heating device design and/or production or line speed.

The amount of furfuryl alcohol-based resin and/or phenol/formaldehyde/furfural-based resin applied to the plurality of fibers, e.g. a fiberglass mat, can vary considerably. Loadings typically can range from about 3 wt % to about 45 wt %, about 10 wt % to about 40 wt %, or from about 15 wt % to about 30 wt %, of nonvolatile binder system based on the dry weight of the fiberglass product. For inorganic fibrous mats, the amount of the furfuryl alcohol-based resin and/or phenol/formaldehyde/furfural-based resin applied to a fiberglass product can normally be confirmed by measuring the percent loss on ignition (LOI) of the fiber mat product.

Once the furfuryl alcohol-based resin and/or phenol/formaldehyde/furfural-based resin have been applied to the plurality of fibers, the resin can be at least partially cured or fully cured. The furfuryl alcohol-based resin and/or phenol/formaldehyde/furfural-based resin can be heated to effect final drying and at least partial curing. The duration and temperature of heating can affect the rate of processibility and handleability, degree of curing and property development of the treated substrate. The curing temperature can be within the range of from about 50° C. to about 300° C., preferably within the range of from about 90° C. to about 230° C. and the curing time will usually be somewhere between about 1 second to about 15 minutes. The curing temperature can include a temperature gradient ranging from a low of about 25° C. to a high of about 280° C., i.e. the temperature applied during the curing process can vary. In at least one specific embodiment, the curing temperature can range from about 190° C. to about 260° C. and the curing time can range from a low of about 1 second, about 2 seconds, or about 3 seconds to a high of about 9 seconds, about 12 seconds, about 15 seconds, about 20 seconds, about 25 seconds, or about 30 seconds.

On heating, water (or other liquid) present in the binder system evaporates, and the composition undergoes curing. These processes can take place in succession or simultaneously. Curing in the present context is to be understood as meaning the chemical alteration of the composition, for example crosslinking through formation of covalent bonds between the various constituents of the composition, especially the esterification reaction between pendant carboxyl (—COOH) of modified polymer and the hydroxyl (—OH) moieties both of the modified polymer and any added polyol (s), the formation of ionic interactions and clusters, and formation of hydrogen bonds.

Alternatively or in addition to heating the fiberglass product catalytic curing can be used to cure the fiberglass product. Catalytic curing of the fiberglass product can include the addition of an acid catalyst. Illustrative acid catalysts can include, but are not limited to, ammonium chloride or p-toluenesulfonic acid.

The drying and curing of the fiber and the furfuryl alcohol-based resin and/or phenol/formaldehyde/furfural-based resin can be conducted in two or more distinct steps. For example, the fiber and the furfuryl alcohol-based resin and/or phenol/formaldehyde/furfural-based resin can be first heated to a temperature and for a time sufficient to substantially dry but not to substantially cure the binder composition and then heated for a second time at a higher temperature and/or for a longer period of time to effect curing (cross-linking to a thermoset structure). Such a preliminary procedure, referred to as "B-staging", can be used to provide a binder-treated product, for example, in roll form, which may at a later stage be fully cured, with or without forming or molding into a particular configuration, concurrent with the curing process. This makes it possible, for example, to use fiberglass products which can be molded and cured elsewhere.

EXAMPLES

In order to provide a better understanding of the foregoing discussion, the following non-limiting examples are offered. Although the examples can be directed to specific embodiments, they are not to be viewed as limiting the invention in any specific respect. All parts, proportions, and percentages are by weight unless otherwise indicated.

Example I

A reaction apparatus was set up with a condensing unit, a cooling reaction chamber, and a mixer. The inventive example (Ex. 1) was made according to the following procedure. A reaction mixture of 585 g of furfuryl alcohol and 18.1 g of maleic anhydride was charged to the reaction apparatus. The reaction mixture was stirred and heated to a temperature of 70° C. The reaction mixture was cooked at 70° C. until a viscosity of 100 cP was reached and the reaction mixture was cooled to 60° C. The reaction mixture was cooked at 60° C. until a viscosity of 250 cP was reached and the reaction mixture was cooled to room temperature. The reaction mixture of the furfuryl alcohol-based resin was divided into two parts. One part contained 400 g of the furfuryl alcohol-based resin, to which was added 21.45 g of 28% ammonium hydroxide to adjust the pH to 7.03. The other part was used to measure the resin's molecular weight. The resin had a number average molecular weight (Mn) of 1,024, a weight average molecular weight (Mw) of 2,304, and a z-average molecular weight (Mz) of 3,965.

Example II

Comparative example (C1) was made by charging 473.5 g of phenol, 2.6 g of FC 615 defoamer, and 423.24 g of a 50% aqueous solution of formaldehyde to a reaction vessel. The reaction mixture was stirred and heated to a temperature of 65° C. 9.72 g of a 50% aqueous solution of NaOH was added. The reaction mixture was cooked for 180 min. 24.29 g of urea prills were added to the reaction vessel. The reaction mixture was stirred at 80° C. for 25 min. The reaction mixture was distilled to remove water. 737.19 g of phenol/formaldehyde-based resin was obtained. Comparative example (C2) was made by the same procedure as C1 but after distillation the resin was diluted with 141.91 g of methanol.

The inventive example (Ex. 2) was prepared by charging 737.19 g of a phenol/formaldehyde-based resin, which was made according to the preparation of comparative example C1. 73.8 g of urea prills, and 114.93 g of furfural to a reaction vessel. The reaction mixture was mixed on rollers for 30 min until the urea prills dissolved. The mixture was stored overnight at room temperature. 925.92 g of phenol/formaldehyde/furfural-based resin was obtained.

Gel times for various catalysts and catalysts loadings were conducted on the phenol/formaldehyde/fufural-based resin (Ex. 2A-2K). Gel time tests were run using a Sunshine gel time meter. The length of the 0.010" torsion wire was adjusted to 0.375". The gap between the two contact arms was adjusted using the instrument gauge to 3/32". Silicone oil was added to a bath so that the test tube was immersed at least 2.5". The silicone bath was placed on a magnetic stir plate, a magnetic stir bar was added to the silicone oil, and the silicone bath was stirred. The immersion heater was connected to the temperature controller. A thermocouple probe was placed into the silicone oil bath and the temperature control was set to 135° C.±0.5° C. A thermometer was used to measure the temperature of the oil bath at 135° C.

Gel times were performed in duplicate for each sample and an average value of the two measurements is reported in Table 1 below. The samples were mixed at 25° C. 5 mL of resin was placed into 18×150 mm test tube. The filled test tube was placed through a hole in a rubber stopper. A spindle was inserted into the sample. The test tube containing the sample and spindle was placed into the silicone bath. The spindle was connected to a driving assembly by means of a magnetic coupler. The test tube was aligned so that the spindle rotated near the center of the test tube. A glass rod was adjusted so that it was ¼" from the bottom of the test tube. The spindle was rotated and when the gel point was reached, both the timer and driving assembly motor automatically stopped and the gel time was recorded. Table 1 shows the gel time test results.

TABLE 1

Gel Time for P/F/F-based Resin with Various Catalysts

| Example | g of P/F/F resin | catalyst | g of catalyst | g of resin tested | Gel time (s) |
|---|---|---|---|---|---|
| Ex. 2A | 10 | 30% citric acid | 2 | 10 | 818 |
| Ex. 2B | 10 | 20% ammonium sulfate | 1.05 | 10 | >1,000 |
| Ex. 2C | 10 | Polyacrylic Acid | 0.3 | 10 | >1,000 |
| Ex. 2D | 10 | p-toluene sulfonic acid | 0.2 | 9.2 | >1,000 |
| Ex. 2E | 11 | p-toluene sulfonic acid | 0.55 | 10 | 904 |
| Ex. 2F | 10.1 | 20% ammonium sulfate | 2 | 10 | >1,000 |
| Ex. 2G | 10 | Polyacrylic Solution | 2 | 10 | >1,000 |
| Ex. 2H | 10 | 90% Formic Acid | 0.6 | 9.5 | 550 |
| Ex. 2I | 10 | Triethylene Tetraamine | 1 | 9.5 | 557 |
| Ex. 2J | 10 | Ammonium hydroxide | 1.5 | 10 | 977 |
| Ex. 2K | 10 | Ammonium hydroxide | 3 | 10 | 1,086 |

As shown in Table 1, the various catalysts can be used to adjust the gel time of the P/F/F-based resin. For example, gel times in a range of about 550 seconds were observed for examples 2H and 2I.

Table 2 shows the pot life of the phenol/formaldehyde/furfural/urea-based resin and two comparative examples. 20 g of resin was mixed with 3 g of 16% sulfuric acid to determine the viscosity change over time.

TABLE 2

Pot Life

| Resin | Time (minutes) | Viscosity (cP) |
|---|---|---|
| C1 | 0 | 2,000 |
| C1 | 60 | 2,000 |
| C1 | 140 | 2,000 |
| C2 | 0 | 100 |
| C2 | 60 | 100 |
| C2 | 140 | 100 |
| Ex. 2 | 0 | 120 |
| Ex. 2 | 60 | 300 |
| Ex. 2 | 140 | 600 |

Table 3 shows the efficiency of various catalysts for polymerizing the furfural into the phenol/formaldehyde resin. The closer the measured solids to the predicted solids the more of the furfural reacted into the polymer matrix as opposed to volatizing. The results showed that sulfuric acid and triethylenetetramine were among the more efficient catalysts.

TABLE 3

Catalyst Efficiency Studies

| Resin | g of resin | Catalyst | g of catalyst | Calc. Solids | Measured Solids | Differential |
|---|---|---|---|---|---|---|
| P/F/F resin | 10 | 55% Urea-Phenosulfonic Acid | 1.5 | 78.22% | 77.14% | 1.08% |
| P/F/F resin | 10 | 32% Sulfuric Acid | 0.75 | 78.23% | 75.39% | 2.84% |
| P/F/F resin | 10 | 32% Sulfuric Acid | 0.75 | 78.88% | 75.25% | 3.63% |
| P/F/F resin | 20 | 16% Sulfuric Acid | 3 | 73.13% | 69.24% | 3.89% |
| P/F/F resin | 10 | 100% Triethyltetramine | 1 | 84.82% | 79.45% | 5.37% |
| P/F/F resin | 10 | 8% Sulfuric Acid | 3 | 65.23% | 59.26% | 5.97% |
| P/F/F resin | 10 | 8% Sulfuric Acid | 2 | 70.00% | 62.77% | 7.23% |
| P/F/F resin | 10 | Ammonium Hydroxide | 1.5 | 74.70% | 65.58% | 9.12% |
| P/F/F resin | 20 | 33% Maleic Acid | 1.6 | 79.57% | 70.34% | 9.23% |
| P/F/F resin | 5 | 33% Maleic Acid | 0.4 | 79.57% | 70.25% | 9.32% |
| P/F/F resin | 10 | Ammonium Hydroxide | 1.5 | 76.09% | 63.49% | 12.60% |
| P/F/F resin | 10 | Glacial Acetic Acid | 1 | 84.82% | 71.11% | 13.71% |
| P/F/F resin | 10 | Precat 4590 (triethylaminesulfate) | 2 | 76.00% | 61.14% | 14.86% |
| P/F/F resin | 10 | None | 0 | 83.30% | 67.98% | 15.32% |
| P/F/F resin | 10 | 80% Formic Acid | 0.6 | 82.26% | 63.49% | 18.77% |

Higher efficiencies can allow for more of the resin solids to bind the paper. Higher efficiency can also emit less volatile organic compounds.

Embodiments of the present disclosure further relate to any one or more of the following paragraphs:

1. A method for making a composite product, comprising: contacting a plurality of cellulosic sheets with a furfuryl alcohol-based resin; and at least partially curing the furfuryl alcohol-based resin to produce a composite product.

2. The method according to paragraph 1, wherein the cellulosic sheets are paper sheets.

3. The method according to any one of paragraph 1 or 2, wherein the furfuryl alcohol-based resin is at least partially cured by heating the plurality of paper sheets contacted with the furfuryl alcohol-based resin to a temperature of about 10° C. to about 150° C.

4. The method according to any one of paragraphs 1 to 3, wherein at least partially curing the resin composition comprises reacting the resin composition with a base compound.

5. The method according to any one of paragraphs 1 to 4, wherein the base compound comprises diethylene triamine, triethylene tetraamine, or any combination thereof.

6. The method according to any one of paragraphs 1 to 5, wherein at least partially curing the resin composition comprises reacting the resin composition with a catalyst.

7. The method according to any one of paragraphs 1 to 6, wherein the catalyst comprises sulfuric acid, lactic acid, diethylenetriamine, phenolsulfonic acid-urea, or any combination thereof.

8. The method according to any one of paragraphs 1 to 7, wherein the plurality of paper sheets comprises kraft paper.

9. The method according to any one of paragraphs 1 to 8, wherein the composite product is a decorative laminate.

10. The method according to any one of paragraphs 1 to 9, wherein the amount of furfuryl alcohol-based resin contacted with the plurality of paper sheets produces a plurality of resin-saturated paper sheets containing about 1 wt % to about 100 wt % of the furfuryl alcohol-based resin, based on the weight of the plurality of paper sheets.

11. The method according to any one of paragraphs 1 to 10, wherein the furfuryl alcohol-based resin has a viscosity of greater than 5 cP.

12. The method according to any one of paragraphs 1 to 11, wherein the furfuryl alcohol-based resin has a concentration of solids of at least 80 wt %.

13. The method according to any one of paragraphs 1 to 12, wherein the synthesis of the furfuryl alcohol-based resin comprises: reacting furfuryl alcohol and one or more acid catalysts or one or more organic anhydrides.

14. The method according to any one of paragraphs 1 to 13, wherein the acid catalyst comprises maleic acid.

15. The method according to any one of paragraphs 1 to 14, wherein a synthesis of the furfuryl alcohol-based resin comprises: reacting furfuryl alcohol and an acid.

16. The method according to any one of paragraphs 1 to 15, wherein the acid comprises maleic acid.

17. The method according to any one of paragraphs 1 to 16, further comprising pressing the plurality of sheets contacted with the resin to a pressure ranging from about 150 kPa to about 2,000 kPa during curing of the furfuryl alcohol-based resin.

18. The method according to any one of paragraphs 1 to 17, wherein about 90% or more of the furfuryl alcohol-based resin is synthesized from furfuryl alcohol made from one or more bio based materials.

19. The method according to any one of paragraphs 1 to 18, wherein the one or more bio based materials comprises corn cobs, sugar cane bagasse, or any combination thereof.

20. The method according to any one of paragraphs 1 to 19, wherein the furfuryl alcohol-based resin is free from phenol and methanol.

21. A method for making a composite product, comprising: contacting a plurality of particulates with a furfuryl alcohol-based resin; and at least partially curing the furfuryl alcohol-based resin to produce a composite product.

22. The method according to paragraphs 21, wherein the plurality of particulates comprises one or more organic-based materials.

23. The method according to any one of paragraph 21 or 22, wherein the one or more organic-based materials comprise cellulose, cotton, polyester, nylon, or any combination thereof.

24. The method according to any one of paragraphs 21 to 23, wherein the plurality of particulates comprises one or more inorganic-based materials.

25. The method according to any one of paragraphs 21 to 24, wherein the one or more inorganic-based materials comprises glass.

26. The method according to any one of paragraphs 21 to 25, wherein the composite product is an abrasive.

27. The method according to any one of paragraphs 21 to 26, wherein the plurality of particles have a particle size is in the range of about 50 μm to about 1,000 nm.

28. The method according to any one of paragraphs 21 to 27, wherein the plurality of particulates are bonded to a paper sheet upon curing of the furfuryl alcohol-based resin.

29. A method for making a phenol/formaldehyde/furfural-based resin, comprising: combining a phenol/formaldehyde-based resin with furfural to produce a phenol/formaldehyde/furfural-based resin, wherein the phenol/formaldehyde/furfural-based resin has a viscosity of about 1 cP to about 1,000 cP at a temperature of about 25° C.

30. The method according to paragraph 29, wherein the phenol/formaldehyde/furfural/urea-based resin contains less than 1 wt % free methanol.

31. The method according to any one of paragraph 29 to 30, wherein the phenol/formaldehyde/furfural/urea-based resin contains less than 10 wt % free phenol.

32. The method according to any one of paragraphs 29 to 31, wherein the phenol/formaldehyde/furfural/urea-based resin has a viscosity of greater than 700 cP.

33. The method according to any one of paragraphs 29 to 32, wherein the phenol/formaldehyde/furfural/urea-based resin has a solids concentration greater than about 60 wt %.

34. The method according to any one of paragraphs 29 to 33, wherein the phenol/formaldehyde-based resin has a weight average molecular weight ranging from about 100 to about 2,000 prior to mixing or reacting with the furfural.

35. The method according to any one of paragraphs 29 to 34, wherein the phenol/formaldehyde-based resin has a molar ratio of formaldehyde to phenol ranging from about 1:1 to about 5:1 when reacted with the furfural.

36. The method according to any one of paragraphs 29 to 35, wherein the phenol/formaldehyde/furfural/urea-based resin has a concentration of about 5 wt % to about 20 wt % furfural, based on the combined weight of the phenol/formaldehyde-based resin and the furfural.

37. A method for making a composite product, comprising: contacting a plurality of substrates with a phenol/formaldehyde/furfural-based resin, and at least partially curing the resin composition to produce a composite product.

38. The method according to paragraph 37, wherein the phenol/formaldehyde/furfural/urea-based resin is cured by heating.

39. The method according to paragraphs 37 or 38, wherein the phenol/formaldehyde/furfural/urea-based resin is cured by contacting the phenol/formaldehyde/furfural/urea-based resin with a base.

40. The method according to any one of paragraphs 37 to 39, wherein the phenol/formaldehyde/furfural/urea-based resin is cured by contacting the phenol/formaldehyde/furfural/urea-based resin with a catalyst.

41. The method according to any one of paragraphs 37 to 40, wherein the composite product is a decorative laminate.

42. The method according to any one of paragraphs 37 to 41, wherein the plurality of substrates are paper sheets.

43. The method according to any one of paragraphs 37 to 42, wherein a synthesis of the phenol/formaldehyde/furfural-based resin comprises combining a phenol/formaldehyde-based resin with furfural to produce the phenol/formaldehyde/furfural-based resin, the method further comprising at least partially curing the phenol/formaldehyde/furfural-based resin in the presence of one or more acids, one or more bases, or a combination thereof.

44. The method according to any one of paragraphs 37 to 43, wherein the phenol/formaldehyde-based resin has a molar ratio of formaldehyde to phenol ranging from about 1:1 to about 5:1 when combined with the furfural.

45. The method according to any one of paragraphs 37 to 44, wherein the phenol/formaldehyde-based resin has a weight average molecular weight ranging from about 100 to about 3,000.

46. The method according to any one of paragraphs 37 to 45, wherein the phenol/formaldehyde/furfural/urea-based resin has a viscosity greater than 100 cP.

47. The method according to any one of paragraphs 37 to 46, wherein the phenol/formaldehyde/furfural/urea-based resin has a solids concentration that is greater than about 60 wt %.

48. The method according to any one of paragraphs 37 to 47, wherein the phenol/formaldehyde/furfural/urea-based resin has a molar ratio of formaldehyde to phenol ranging from about 1:1 to about 5:1.

49. The method according to any one of paragraphs 37 to 48, wherein the phenol/formaldehyde/furfural-based resin has a concentration of about 5 wt % to about 20 wt % furfural, based on the combined weight of the phenol/formaldehyde-based resin and the furfural.

50. The method according to any one of paragraphs 37 to 49, wherein the phenol/formaldehyde/furfural/urea-based resin has a free phenol concentration of less than about 20 wt %.

51. The method according to any one of paragraphs 37 to 50, wherein the phenol/formaldehyde/furfural/urea-based resin has a methanol concentration of less than about 1 wt %.

52. A method for making a single-ply, resin-saturated product, comprising: contacting a single cellulosic sheet with a furfuryl alcohol-based resin; and at least partially curing the furfuryl alcohol-based resin to produce the single-ply, resin-saturated product.

53. The method according to paragraph 52, wherein the single-ply resin-saturated product is selected from the group consisting of: an oil filter, a paint roller tube, and an electrical laminate.

54. A method for making a single-ply resin-saturated product comprising: contacting a single cellulosic sheet with a phenol/formaldehyde/furfural-based resin; and at least partially curing the phenol/formaldehyde/furfural-based resin to produce the single-ply resin-saturated product.

55. The method according to paragraph 54, wherein the single-ply resin-saturated product is selected from the group consisting of: an oil filter, a paint roller tube, an electrical laminate.

56. A method for making a phenol/formaldehyde/furfural-based resin, comprising: combining a phenol/formaldehyde-based resin with furfural to produce a phenol/formaldehyde/furfural-based resin, wherein the phenol/formaldehyde/furfural-based resin has a viscosity of about 1 cP to about 1,000 cP at a temperature of about 25° C.

57. The method according to paragraph 56, wherein the phenol/formaldehyde/furfural-based resin contains less than 1 wt % free methanol.

58. The method according to paragraph 56 or 57, wherein the phenol/formaldehyde/furfural-based resin contains less than 1 wt % free phenol.

59. The method according to any one of paragraphs 56 to 58, wherein the phenol/formaldehyde/furfural-based resin has a viscosity of less than 700 cP.

60. The method according to any one of paragraphs 56 to 59, wherein the phenol/formaldehyde/furfural-based resin has a solids concentration greater than about 60 wt %.

61. The method according to any one of paragraphs 56 to 60, wherein the phenol/formaldehyde-based resin has a weight average molecular weight ranging from about 100 to about 2,000 prior to combining with the furfural, and wherein the phenol/formaldehyde-based resin has a molar ratio of formaldehyde to phenol ranging from about 1:1 to about 5:1 when combined with the furfural.

62. The method according to any one of paragraphs 56 to 61, wherein the phenol/formaldehyde/furfural-based resin has a concentration of about 5 wt % to about 20 wt % furfural, based on the combined weight of the phenol/formaldehyde-based resin and the furfural.

63. The method according to any one of paragraphs 56 to 62, wherein the phenol/formaldehyde-based resin has a weight average molecular weight ranging from about 100 to about 2,000 and a molar ratio of formaldehyde to phenol ranging from about 1:1 to about 5:1 when combined with the furfural, wherein the phenol/formaldehyde/furfural-based resin contains less than 1 wt % free methanol and less than 1 wt % free phenol, wherein the phenol/formaldehyde/furfural-based resin has a solids concentration greater than about 60 wt %, and wherein the phenol/formaldehyde/furfural-based resin has a concentration of about 5 wt % to about 20 wt % furfural, based on the combined weight of the phenol/formaldehyde-based resin and the furfural.

64. A method for making a composite product, comprising: contacting a plurality of substrates with a phenol/formaldehyde/furfural-based resin, wherein the phenol/formaldehyde/furfural-based resin has a viscosity of about 1 cP to about 1,000 cP at a temperature of about 25° C.; and at least partially curing the phenol/formaldehyde/furfural-based resin to produce a composite product.

65. The method according to paragraph 64, wherein the phenol/formaldehyde/furfural-based resin is cured by heating.

66. The method according to paragraph 64 or 65, wherein the phenol/formaldehyde/furfural-based resin is cured by contacting the phenol/formaldehyde/furfural-based resin with a base.

67. The method according to any one of paragraphs 64 to 66, wherein the phenol/formaldehyde/furfural-based resin is cured by contacting the phenol/formaldehyde/furfural-based resin with a catalyst.

68. The method according to any one of paragraphs 64 to 67, wherein the plurality of substrates comprise sheets of paper.

69. The method according to any one of paragraphs 64 to 68, wherein a synthesis of the phenol/formaldehyde/furfural-based resin comprises combining a phenol/formaldehyde-based resin with furfural to produce the phenol/formaldehyde/furfural-based resin, and wherein the phenol/formaldehyde/furfural-based resin is at least partially cured by contacting the phenol/formaldehyde/furfural-based resin with one or more acids, one or more bases, or a combination thereof.

70. The method according to any one of paragraphs 64 to 69, wherein the phenol/formaldehyde/furfural-based resin is made by combining a phenol/formaldehyde-based resin with furfural, wherein the phenol/formaldehyde-based resin has a weight average molecular weight ranging from about 100 to about 2,000 and a molar ratio of formaldehyde to phenol ranging from about 1:1 to about 5:1 when combined with the furfural, wherein the phenol/formaldehyde/furfural-based resin contains less than 1 wt % free methanol and less than 1 wt % free phenol, wherein the phenol/formaldehyde/furfural-based resin has a solids concentration greater than about 60 wt %, and wherein the phenol/formaldehyde/furfural-based resin has a concentration of about 5 wt % to about 20 wt % furfural, based on the combined weight of the phenol/formaldehyde-based resin and the furfural.

71. A method for making a single-ply, resin-saturated product, comprising: contacting a single cellulosic sheet with a phenol/formaldehyde/furfural-based resin, wherein the phenol/formaldehyde/furfural-based resin has a viscosity of about 1 cP to about 1,000 cP at a temperature of about 25° C.; and at least partially curing the phenol/formaldehyde/furfural-based resin to produce a single-ply resin-saturated product.

72. The method according to paragraph 71, wherein the single-ply resin-saturated product is selected from the group consisting of: an oil filter, a paint roller tube, an electrical laminate.

73. The method according to paragraph 71 or 72, wherein the phenol/formaldehyde/furfural-based resin is cured by heating, by contacting the phenol/formaldehyde/furfural-based resin with a base, by contacting the phenol/formaldehyde/furfural-based resin with a catalyst, or any combination thereof.

74. The method according to any one of paragraphs 71 to 73, wherein the phenol/formaldehyde/furfural-based resin has a solids concentration greater than about 60 wt %.

75. The method according to any one of paragraphs 71 to 74, wherein the phenol/formaldehyde/furfural-based resin is made by combining a phenol/formaldehyde-based resin with furfural, wherein the phenol/formaldehyde-based resin has a weight average molecular weight ranging from about 100 to about 2,000 and a molar ratio of formaldehyde to phenol ranging from about 1:1 to about 5:1 when combined with the furfural, wherein the phenol/formaldehyde/furfural-based resin contains less than 1 wt % free methanol and less than 1 wt % free phenol, wherein the phenol/formaldehyde/furfural-based resin has a solids concentration greater than about 60 wt %, and wherein the phenol/formaldehyde/furfural-based resin has a concentration of about 5 wt % to about 20 wt % furfural, based on the combined weight of the phenol/formaldehyde-based resin and the furfural.

76. The method according to any one of paragraphs 56 to 63, 69, 70, or 75, wherein the phenol/formaldehyde-based resin further comprises urea.

77. The method according to claim 76, wherein the urea is present in an amount from about 1 wt % to about 20 wt %, based on the total weight of the phenol/formaldehyde-based resin.

78. A method for making a multi-ply, resin-saturated product, comprising: contacting a single cellulosic sheet with a phenol/formaldehyde/furfural-based resin, wherein the phenol/formaldehyde/furfural-based resin has a viscosity of about 1 cP to about 1,000 cP at a temperature of about 25° C.; and at least partially curing the phenol/formaldehyde/furfural-based resin to produce a single-ply resin-saturated product.

79. The method according to paragraph 78, wherein the phenol/formaldehyde/furfural-based resin is cured by heating, by contacting the phenol/formaldehyde/furfural-based resin with a base, by contacting the phenol/formaldehyde/furfural-based resin with a catalyst, or any combination thereof.

80. The method according to paragraph 78 or 79, wherein the phenol/formaldehyde/furfural-based resin contains less than 1 wt % free methanol.

81. The method according to any one of paragraphs 78 to 80, wherein the phenol/formaldehyde/furfural-based resin contains less than 1 wt % free phenol.

82. The method according to any one of paragraphs 78 to 81, wherein the phenol/formaldehyde/furfural-based resin has a viscosity of less than 700 cP.

83. The method according to any one of paragraphs 78 to 82, wherein the phenol/formaldehyde/furfural-based resin has a solids concentration greater than about 60 wt %.

84. The method according to any one of paragraphs 78 to 83, wherein the phenol/formaldehyde-based resin has a weight average molecular weight ranging from about 100 to about 2,000 prior to combining with the furfural, and wherein the phenol/formaldehyde-based resin has a molar ratio of formaldehyde to phenol ranging from about 1:1 to about 5:1 when combined with the furfural.

85. The method according to any one of paragraphs 78 to 84, wherein the phenol/formaldehyde/furfural-based resin has a concentration of about 5 wt % to about 20 wt % furfural, based on the combined weight of the phenol/formaldehyde-based resin and the furfural.

86. The method according to any one of paragraphs 78 to 85, wherein the phenol/formaldehyde/furfural-based resin is made by combining a phenol/formaldehyde-based resin with furfural, wherein the phenol/formaldehyde-based resin has a weight average molecular weight ranging from about 100 to about 2,000 and a molar ratio of formaldehyde to phenol ranging from about 1:1 to about 5:1 when combined with the furfural, wherein the phenol/formaldehyde/furfural-based resin contains less than 1 wt % free methanol and less than 1 wt % free phenol, wherein the phenol/formaldehyde/furfural-based resin has a solids concentration greater than about 60 wt %, and wherein the phenol/formaldehyde/furfural-based resin has a concentration of about 5 wt % to about 20 wt % furfural, based on the combined weight of the phenol/formaldehyde-based resin and the furfural.

87. The method according to any one of paragraphs 78 to 87, wherein the plies making up the multi-ply, resin-saturated product comprise sheets of paper.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making a composite product, comprising:
    contacting a plurality of substrates with a phenol/formaldehyde/furfural-based resin, wherein the phenol/formaldehyde/furfural-based resin has a viscosity of about 1 cP to about 1,000 cP at a temperature of about 25° C., and wherein the substrates comprise cellulose fibers; and
    at least partially curing the phenol/formaldehyde/furfural-based resin to produce a composite product.

2. The method of claim 1, wherein the phenol/formaldehyde/furfural-based resin is cured by contacting the phenol/formaldehyde/furfural-based resin with a base.

3. The method of claim 1, wherein the phenol/formaldehyde/furfural-based resin is cured by contacting the phenol/formaldehyde/furfural-based resin with a catalyst, and wherein the catalyst is an acid.

4. The method of claim 1, wherein the plurality of substrates comprises sheets of paper.

5. The method of claim 1, wherein a synthesis of the phenol/formaldehyde/furfural-based resin comprises combining a phenol/formaldehyde-based resin with furfural to produce the phenol/formaldehyde/furfural-based resin, and wherein the phenol/formaldehyde/furfural-based resin is at least partially cured by contacting the phenol/formaldehyde/furfural-based resin with one or more catalysts.

6. The method of claim 1, wherein the phenol/formaldehyde/furfural-based resin is made by combining a phenol/formaldehyde-based resin with furfural,
    wherein the phenol/formaldehyde-based resin has a weight average molecular weight of about 100 to about 2,000 and a molar ratio of formaldehyde to phenol of about 1:1 to about 5:1 when combined with the furfural,
    wherein the phenol/formaldehyde/furfural-based resin, prior to curing, contains less than 1 wt % of free methanol and less than 1 wt % of free phenol,
    wherein the phenol/formaldehyde/furfural-based resin, prior to curing, has a solids concentration greater than 60 wt %, and
    wherein the phenol/formaldehyde/furfural-based resin has a concentration of about 5 wt % to about 20 wt % of furfural, based on the combined weight of the phenol/formaldehyde-based resin and the furfural.

7. The method of claim 1, wherein the phenol/formaldehyde/furfural-based resin has a viscosity of about 250 cP to about 900 cP at a temperature of about 25° C.

8. The method of claim 1, wherein the phenol/formaldehyde/furfural-based resin is made by combining a phenol/formaldehyde-based resin with furfural, and wherein the phenol/formaldehyde/furfural-based resin has a concentration of about 1.5 wt % to about 15 wt % of furfural, based on the combined weight of the phenol/formaldehyde-based resin and the furfural.

9. The method of claim 1, wherein the phenol/formaldehyde/furfural-based resin, prior to curing, contains about 0.05 wt % to about 0.5 wt % of free methanol and about 0.05 wt % to about 0.5 wt % of free phenol.

10. A method for making a single-ply, resin-saturated product, comprising:
    contacting a single cellulosic sheet with a phenol/formaldehyde/furfural-based resin to produce a mixture, wherein the phenol/formaldehyde/furfural-based resin has a viscosity of about 1 cP to about 1,000 cP at a temperature of about 25° C.; and
    at least partially curing the phenol/formaldehyde/furfural-based resin in the mixture to produce a single-ply resin-saturated product comprising an at least partially cured phenol/formaldehyde/furfural-based resin.

11. The method of claim 10, wherein the single-ply resin-saturated product is selected from the group consisting of: an oil filter, a paint roller tube, and an electrical laminate.

12. The method of claim 10, wherein the phenol/formaldehyde/furfural-based resin is cured by contacting the phenol/formaldehyde/furfural-based resin with a catalyst.

13. The method of claim 12, wherein the phenol/formaldehyde/furfural-based resin has a viscosity of about 250 cP to about 900 cP at a temperature of about 25° C., and wherein the catalyst comprises sulfuric acid, maleic acid, glacial acetic acid, formic acid, an urea-phenolsulfonic acid solution, or any mixture thereof.

14. The method of claim 12, wherein the catalyst comprises triethylamine, urea, or a mixture thereof.

15. The method of claim 10, wherein the phenol/formaldehyde/furfural-based resin, prior to curing, has a solids concentration greater than 60 wt %.

16. The method of claim 10, wherein the phenol/formaldehyde/furfural-based resin is made by combining a phenol/formaldehyde-based resin with furfural,
wherein the phenol/formaldehyde-based resin has a weight average molecular weight of about 100 to about 2,000 and a molar ratio of formaldehyde to phenol of about 1:1 to about 5:1 when combined with the furfural,
wherein the phenol/formaldehyde/furfural-based resin, prior to curing, contains less than 1 wt % of free methanol and less than 1 wt % of free phenol,
wherein the phenol/formaldehyde/furfural-based resin, prior to curing, has a solids concentration greater than 60 wt %, and
wherein the phenol/formaldehyde/furfural-based resin has a concentration of about 5 wt % to about 20 wt % of furfural, based on the combined weight of the phenol/formaldehyde-based resin and the furfural.

17. The method of claim 10, wherein the phenol/formaldehyde/furfural-based resin is made by combining a phenol/formaldehyde-based resin with furfural, and wherein the phenol/formaldehyde/furfural-based resin has a concentration of about 1.5 wt % to about 15 wt % of furfural, based on the combined weight of the phenol/formaldehyde-based resin and the furfural.

18. The method of claim 10, wherein the phenol/formaldehyde/furfural-based resin, prior to curing, contains about 0.05 wt % to about 0.5 wt % of free methanol and about 0.05 wt % to about 0.5 wt % of free phenol.

19. A method for making a composite product, comprising:

contacting a plurality of substrates with a phenol/formaldehyde/furfural-based resin to produce a mixture, wherein the substrates comprise cellulose fibers, wherein the phenol/formaldehyde/furfural-based resin is made by combining a phenol/formaldehyde-based resin with furfural, wherein the phenol/formaldehyde/furfural-based resin has a viscosity of about 1 cP to about 900 cP at a temperature of about 25° C., wherein the phenol/formaldehyde/furfural-based resin contains about 0.05 wt % to about 0.5 wt % of free methanol and about 0.05 wt % to about 0.5 wt % of free phenol, and wherein the phenol/formaldehyde/furfural-based resin has a concentration of about 1.5 wt % to about 15 wt % of the furfural, based on the combined weight of the phenol/formaldehyde-based resin and the furfural; and at least partially curing the phenol/formaldehyde/furfural-based resin in the mixture by contacting the phenol/formaldehyde/furfural-based resin with a catalyst to produce a composite product comprising an at least partially cured phenol/formaldehyde/furfural-based resin, wherein the catalyst is an acid, and wherein the catalyst is in a concentration of about 0.2 wt % to about 6 wt %, based on the combined weight of the phenol/formaldehyde-based resin, the furfural, and the catalyst.

20. The method of claim 19, wherein the acid comprises sulfuric acid, maleic acid, glacial acetic acid, formic acid, an urea-phenolsulfonic acid solution, or any mixture thereof, and wherein the concentration is about 0.5 wt % to about 3 wt %.

\* \* \* \* \*